United States Patent
Ross et al.

(10) Patent No.: US 12,450,226 B1
(45) Date of Patent: Oct. 21, 2025

(54) EFFICIENTLY ANALYZING TRACE DATA

(71) Applicant: Cisco Technology, Inc., San Jose, CA (US)

(72) Inventors: Joseph Ari Ross, Redwood City, CA (US); Julien Didier Jean Veron Vialard, Stanford, CA (US); Eric Allen Wohlstadter, Menlo Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/297,527

(22) Filed: Apr. 7, 2023

(51) Int. Cl.
    *G06F 16/00* (2019.01)
    *G06F 16/22* (2019.01)
    *G06F 16/23* (2019.01)

(52) U.S. Cl.
    CPC ...... *G06F 16/2379* (2019.01); *G06F 16/2228* (2019.01)

(58) Field of Classification Search
    CPC ............ G06F 16/2228; G06F 16/2329; G06F 16/2379
    USPC ....................................................... 707/696
    See application file for complete search history.

(56) References Cited

U.S. PATENT DOCUMENTS

| | | | |
|---|---|---|---|
| 6,658,652 B1 * | 12/2003 | Alexander, III | G06F 11/366 711/6 |
| 7,937,344 B2 | 5/2011 | Baum et al. | |
| 8,112,425 B2 | 2/2012 | Baum et al. | |
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |
| 9,940,459 B1 * | 4/2018 | Saxe | G06F 21/561 |
| 9,967,351 B2 * | 5/2018 | Maheshwari | G06F 9/542 |
| 10,127,258 B2 | 11/2018 | Lamas et al. | |
| 10,198,155 B2 * | 2/2019 | Maheshwari | G06F 3/0484 |
| 10,209,956 B2 * | 2/2019 | Fletcher | G06F 7/10 |
| 10,305,758 B1 * | 5/2019 | Bhide | G06F 11/328 |
| 10,505,825 B1 * | 12/2019 | Bettaiah | G06F 16/24578 |
| 10,536,353 B2 * | 1/2020 | Gupta | H04L 67/51 |

(Continued)

FOREIGN PATENT DOCUMENTS

| | | |
|---|---|---|
| JP | 2018528506 A | 9/2018 |
| WO | 2021217119 A1 | 10/2021 |

OTHER PUBLICATIONS

Splunk Enterprise 8.0.0 Overview, available online, retrieved May 20, 2020 from docs.splunk.com.

(Continued)

*Primary Examiner* — Ann J Lo
*Assistant Examiner* — Rezwanul Mahmood
(74) *Attorney, Agent, or Firm* — Kilpatrick Townsend & Stockton LLP

(57) ABSTRACT

Queries may be resolved against large quantities of collected data (such as traces) by dividing collected data into multiple time intervals and incrementally assigning multiple workers the query and the collected data over the multiple time intervals. For each time interval, these workers may conditionally update one or more summary data structures within the worker based on the query and the portion of collected data assigned to the worker. The summary data structures for each time interval may then be incrementally returned and merged with results from earlier time intervals to create a final merged query result.

20 Claims, 16 Drawing Sheets

(56) References Cited

U.S. PATENT DOCUMENTS

| | | | | |
|---|---|---|---|---|
| 11,250,069 | B1* | 2/2022 | Bianchi | G06F 16/9038 |
| 11,321,217 | B1* | 5/2022 | Agarwal | G06F 11/302 |
| 11,347,622 | B1* | 5/2022 | Agarwal | G06F 11/323 |
| 11,347,625 | B1* | 5/2022 | Agarwal | G06F 11/3466 |
| 11,388,211 | B1* | 7/2022 | Breeden | G06F 16/24568 |
| 11,516,269 | B1* | 11/2022 | Chang, Jr. | H04L 65/612 |
| 11,526,425 | B1* | 12/2022 | Karis | G06F 11/3644 |
| 11,582,316 | B1* | 2/2023 | Danyi | H04L 67/52 |
| 11,620,164 | B1* | 4/2023 | Karis | G06F 11/3466 |
| | | | | 718/104 |
| 11,693,842 | B2* | 7/2023 | Masson | G06F 11/3082 |
| | | | | 707/693 |
| 11,693,850 | B1* | 7/2023 | Agarwal | G06F 11/323 |
| | | | | 707/722 |
| 11,727,016 | B1* | 8/2023 | Agarwal | G06F 16/2428 |
| | | | | 707/769 |
| 11,755,559 | B1* | 9/2023 | Tankersley | G06F 16/2358 |
| | | | | 707/694 |
| 11,836,484 | B1* | 12/2023 | Hensley | G06F 8/71 |
| 11,853,330 | B1* | 12/2023 | Bannon | G06F 3/0482 |
| 11,860,760 | B1* | 1/2024 | Agarwal | G06F 16/00 |
| 12,182,104 | B1* | 12/2024 | Singh | G06F 16/2228 |
| 2007/0061487 | A1* | 3/2007 | Moore | G06F 16/27 |
| | | | | 707/E17.032 |
| 2009/0172059 | A1* | 7/2009 | Cormode | H04L 43/00 |
| | | | | 708/274 |
| 2016/0036837 | A1* | 2/2016 | Jain | H04L 63/1416 |
| | | | | 726/23 |
| 2017/0250953 | A1* | 8/2017 | Jain | G06F 21/552 |
| 2018/0089328 | A1* | 3/2018 | Bath | G06F 16/901 |
| 2018/0091401 | A1* | 3/2018 | Richards | H04L 41/0631 |
| 2018/0091413 | A1* | 3/2018 | Richards | H04L 43/20 |
| 2018/0101466 | A1* | 4/2018 | O'Dowd | G06F 16/345 |
| 2019/0031194 | A1* | 1/2019 | Kim | B60W 30/06 |
| 2019/0098106 | A1 | 3/2019 | Mungel et al. | |
| 2019/0370677 | A1* | 12/2019 | Garvey | G06N 7/01 |
| 2020/0257657 | A1* | 8/2020 | Ertl | G06F 7/582 |
| 2020/0258328 | A1* | 8/2020 | Gawthorpe | G01C 21/32 |
| 2020/0364607 | A1* | 11/2020 | BahenaTapia | G06N 7/01 |
| 2021/0028981 | A1 | 1/2021 | Subramanian et al. | |
| 2021/0056586 | A1* | 2/2021 | Bao | G06Q 30/0205 |
| 2021/0133015 | A1* | 5/2021 | Agarwal | G06F 16/2455 |
| 2021/0232485 | A1* | 7/2021 | Agarwal | G06F 11/3624 |
| 2021/0382895 | A1 | 12/2021 | Raizman et al. | |
| 2022/0137860 | A1 | 5/2022 | Zhuo et al. | |
| 2022/0224776 | A1* | 7/2022 | Doshi | G06F 12/0897 |
| 2023/0244637 | A1* | 8/2023 | Wu | G06F 16/164 |
| | | | | 707/736 |
| 2023/0319054 | A1* | 10/2023 | Hendrey | H04L 63/105 |
| | | | | 726/4 |
| 2024/0012859 | A1* | 1/2024 | Burda | G06F 16/906 |
| 2024/0097998 | A1* | 3/2024 | Rodriguez-Natal | |
| | | | | H04L 69/321 |

OTHER PUBLICATIONS

Splunk Cloud 8.0.2004 User Manual, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

Carraso, David, "Exploring Splunk," published by CITO Research, New York, NY, Apr. 2012.

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

Jeffrey Dean et al., "MapReduce: Simplifed Data Processing on Large Clusters" Google, Inc., OSDI 2004, pp. 1-13.

Tedd Dunning "Computing Extremely Accurate Quantiles Using t-Digests" MapR Technologies, Inc Santa Clara, CA, Feb. 11, 2019, pp. 1-22.

Yael Ben-Haim et al. "A Streaming Parallel Decision Tree Algorithm" IBM, 2010, 24 pages.

Rama Shahout et al; "SQUAD: Combining Sketching and Sampling Is Better than Either for Per-item Quantile Estimation" Jan. 6, 2022, 6 pages.

Ahmed Metwally et al. "Efficient Computation of Frequent and Top-k Elements in Data Streams" UCSB, 15 pages.

Snowflake "Percentile_CONT" pulled from the Internet on Apr. 7, 2023 https://docs.snowflake.com/en/sql-reference/functions/percentile_cont#examples, 1 page.

Graham Cormode et al. "Relative Error Streaming Quantiles" May 28, 2021, 46 pages.

PCT/US2024/013784, "International Search Report and Written Opinion", Jul. 16, 2024, 14 pages.

PCT/US2024/013784, "Invitation to Pay Additional Fees and, Where Applicable, Protest Fee", May 23, 2024, 6 pages.

U.S. Appl. No. 18/297,520, "Non-Final Office Action", Dec. 20, 2024, 21 pages.

PCT/US2024/013784, "Written Opinion", Jan. 20, 2025, 6 pages.

* cited by examiner

900 ⟶

1000

1100 ⟶

EFFICIENTLY ANALYZING TRACE DATA

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data can include log data, performance data, diagnostic data, metrics, tracing data, or any other data that can be analyzed to diagnose equipment performance problems, monitor user interactions, and to derive other insights.

Large quantities of machine data are both time and resource-intensive to process. Efficiently processing this data in response to one or more queries presents technical challenges.

BRIEF DESCRIPTION OF THE DRAWINGS

Illustrative examples are described in detail below with reference to the following figures.

DETAILED DESCRIPTION

Figure 1:
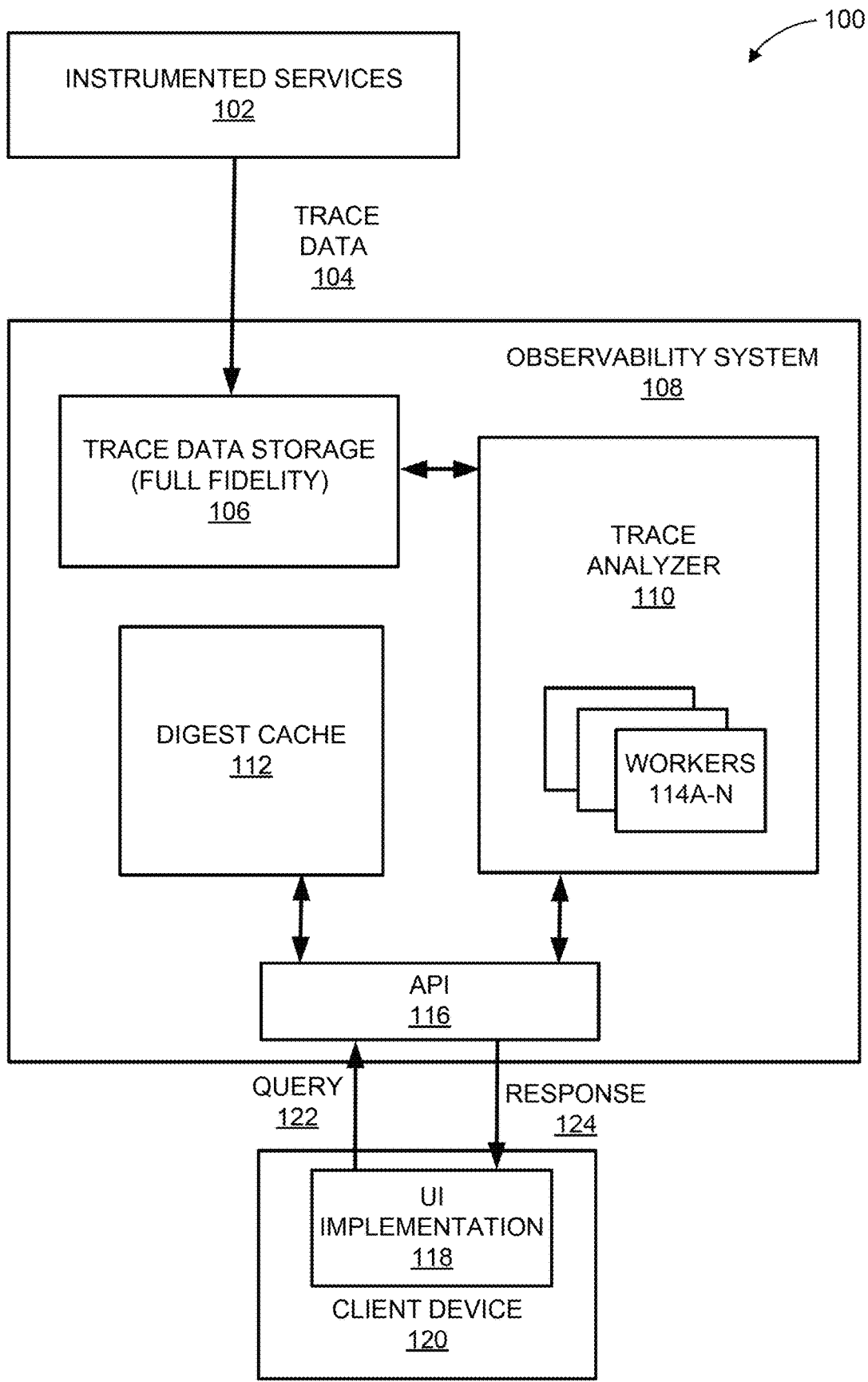
FIG. 1 is a block diagram of an exemplary trace analysis environment, according to at least one implementation.

An observability system (such as the observability system 108 of FIG. 1, etc.) can offer a unified environment to monitor infrastructure, applications, and supporting services in real-time, in a single pane of glass. The platform can integrate with common data sources to get data from on-premise and cloud infrastructure, applications and services, and user interfaces into the observability system.

In certain implementations, when data is sent from each layer of a full-stack environment to the observability system, the observability system can transform raw metrics, traces, and logs into actionable insights in the form of dashboards, visualizations, alerts, and more. The features of the observability system can enable users to quickly and intelligently respond to outages and identify root causes, while also giving users the data-driven guidance needed to optimize performance and productivity.

Additionally, in certain implementations the observability system can receive data from a user's environment using supported integrations to common data sources. The observability system can offer insights into infrastructure as well as the ability to perform powerful, capable analytics infrastructure and resources across hybrid and multi-cloud environments. Infrastructure monitoring offers support for a broad range of integrations for collecting all kinds of data, from system metrics for infrastructure components to custom data from applications.

Further, in certain implementations the observability system can collect traces and spans to monitor distributed and/or non-distributed applications. A trace is a collection of actions, or spans, that occur to complete a transaction. Examples of this trace data may include distributed trace data, stack trace data, etc. The observability system can collect and analyze every span and trace from each of the services connected to the observability system to give users full-fidelity access to all of their application data (e.g., as opposed to a sample-based approach). Of course, however, sampling may be performed with the observability system collecting and analyzing a subset of spans and/or traces from each of the connected services. Also, results of either of these analysis techniques (full-fidelity or sampled) may be used to generate one or more metrics for display on interfaces such as dashboards. Traces and spans may also be conceptually linked to logs, infrastructure status information, etc.

Further still, in certain implementations the observability system can provide insights about the performance and health of a front-end user experience of one or more applications. The observability system can collect performance metrics, web vitals, errors, and other forms of data to enable users to detect and troubleshoot problems in their application, measure the health of their application, and assess the performance of their user experience.

Also, in certain implementations the observability system can also synthetically measure the performance of web-based properties. The observability system can offer features that provide insights that enable users to optimize uptime and performance of application programming interfaces (APIs), service endpoints, and end user experiences and prevent web performance issues.

In addition, in certain implementations the observability system can troubleshoot applications and infrastructure behavior using high-context logs. Users can perform codeless queries on logs to detect the source of problems in their systems. Users can also extract fields from logs to set up log processing rules and transform their data as it arrives.

Furthermore, in certain implementations the observability system includes incident response software that aligns log management, monitoring, chat tools, and more for a single pane of glass into system health. The observability system can automate delivery of alerts to get the right alert, to the right user, at the right time.

Queries may be resolved against large quantities of collected data (such as traces) by dividing collected data into multiple partitions and incrementally assigning multiple workers the query and the collected data over the multiple partitions. Partitions may be based on one or more of numerous attributes, such as start time, time range, response code, country code, customer name, latency, error message, organization identifier, and unique object identifier. For each partition, these workers may conditionally update one or more summary data structures within the worker based on the query and the portion of collected data assigned to the worker. The summary data structures for each partition may then be incrementally returned and merged with results from other partitions to create a final merged query result. In one implementation, a list of matches to the query may also be determined and returned by the workers (e.g., in addition to the one or more summary data structures).

Additionally, workers may conditionally collect a set of unsummarized example traces included with the results. This unsummarized trace data allows users of the system to examine the full details for a sample of the traces included in the summary.

FIG. 1 illustrates a block diagram of an exemplary trace analysis environment 100, according to one exemplary implementation. As shown, instrumented services 102 provide trace data 104 (also known herein as "traces") to an observability system 108, where received trace data 104 is stored in full-fidelity trace data storage 106. The full-fidelity trace data storage 106 may include any type of data storage, including hard disk drive storage, flash memory storage, random access memory (RAM) storage, etc. Each of the instrumented services 102 may include computing hardware and/or software and may include a monitoring agent that monitors data input to and output by the instrumented service 102. Exemplary details of the receipt and storage of this trace data 104 are found in step 302 of FIG. 3.

Additionally, within the exemplary trace analysis environment 100, a user interface (UI) implementation 118 of a client device 120 is in communication with an application program interface (API) service 116 of the observability system 108. In one implementation, the client device 120 may include computing hardware and/or software that enables the UI implementation 118. The UI implementation 118 may include an interface used by one or more users to submit queries 122 to the observability system 108 and view a response 124 to the query 122. Exemplary details of the sending of queries 122 are found in step 304 of FIG. 3.

Further, in response to receiving a query 122 from the UI implementation 118, the API service 116 may identify a predetermined data subset included within the query 122 and may divide this data subset into multiple partitions. The data subset may be identified in any of multiple ways, such as with a filter string (where the filter string may be used to partition the workers) or by enumerating partitions. An exemplary division of a data subset into partitions is found in step 306 of FIG. 3. The query 122 may then be sent from the API service 116 to a group of workers 114A-N within a trace analyzer 110 for resolution against trace data stored in the full-fidelity trace data storage 106 for each of the multiple partitions. An exemplary resolution of a query by a group of workers 114A-N is found in step 308 of FIG. 3 as well as FIG. 4. The trace analyzer 110 may include a computing system such as a cloud computing environment.

Further still, the group of workers 114A-N may incrementally return (to the API service 116) approximate summary data structures and sampled example traces for each of the multiple partitions. For example, the group of workers 114A-N may return an approximate summary data structure for one partition, followed by an approximate summary data structure for another partition, etc. An example of the incremental receipt of an approximate summary data structure is found in step 310 of FIG. 3.

Also, upon receiving these approximate summary data structures, the API service 116 may retrieve earlier approximate summary data structures from the digest cache 112 and may merge the earlier approximate summary data structures with the current approximate summary data structures to create merged approximate summary data structures which are then stored in the digest cache 112. An example of the incremental merging of approximate summary data structures is found in step 312 of FIG. 3.

In addition, merged approximate summary data structures may be provided as a response 124 from the API service 116 to the UI implementation 118 of the client device 120. For example, the UI implementation 118 may periodically poll the API service 116 for updates to the query 122, and each time a polling request is received, the API service 116 may retrieve and return the latest merged approximate summary data structures from the digest cache 112. An example of the returning of merged approximate summary data structures is found in step 314 of FIG. 3.

In some environments, a user of the observability system 108 may install and configure, on computing devices owned and operated by the user, one or more software applications that implement some or all of the components of the observability system 108. For example, with reference to FIG. 1, a user may install a software application on the instrumented services 102 owned by the user and configure each server to operate as one or more components of the observability system 108. This arrangement generally may be referred to as an "on-premises" solution. That is, the observability system 108 can be installed and can operate on computing devices directly controlled by the user of observability system 108. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of the observability system 108 operate.

In certain implementations, one or more of the components of the observability system 108 can be implemented in a shared computing resource environment. In this context, a shared computing resource environment or cloud-based service can refer to a service hosted by one more computing resources that are accessible to end users over a network, for example, by using a web browser or other application on a client device to interface with the remote computing resources. For example, a service provider may provide an observability system 108 by managing computing resources configured to implement various aspects of the system (e.g., the trace analyzer 110, the API service 116, the digest cache 112, the full fidelity trace data storage 106, other components, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

When implemented in a shared computing resource environment, the underlying hardware (non-limiting examples: processors, hard drives, solid-state memory, RAM, etc.) on which the components of the observability system 108 execute can be shared by multiple customers or tenants as part of the shared computing resource environment. In addition, when implemented in a shared computing resource environment as a cloud-based service, various components of the observability system 108 can be implemented using containerization or operating-system-level virtualization, or other virtualization techniques. For example, one or more components of the trace analyzer 110, the API service 116, the digest cache 112, the full fidelity trace data storage 106, etc. can be implemented as separate software containers or container instances. Each container instance can have certain computing resources (e.g., memory, processor, etc.) of an underlying hosting computing system (e.g., server, microprocessor, etc.) assigned to it, but may share the same operating system and may use the operating system's system call interface. Each container may provide an isolated execution environment on the host system, such as by providing a memory space of the hosting system that is logically isolated from memory space of other containers. Further, each container may run the same or different computer applications concurrently or separately and may interact with each other. Although reference is made herein to containerization and container instances, it will be understood that other virtualization techniques can be used. For example, the components can be implemented using virtual machines using full virtualization or paravirtualization, etc. Thus, where reference is made to "containerized" components, it should be understood that such components may additionally or alternatively be implemented in other isolated execution environments, such as a virtual machine environment.

Implementing the observability system 108 in a shared computing resource environment can provide a number of benefits. In some cases, implementing the observability system 108 in a shared computing resource environment can make it easier to install, maintain, and update the components of the observability system 108. For example, rather than accessing designated hardware at a particular location to install or provide a component of the observability system 108, a component can be remotely instantiated or updated as desired. Similarly, implementing the observability system 108 in a shared computing resource environment or as a cloud-based service can make it easier to meet dynamic demand. For example, if the observability system 108 experiences significant load at indexing or search, additional compute resources can be deployed to process the additional data or queries. In an "on-premises" environment, this type of flexibility and scalability may not be possible or feasible.

In addition, by implementing the observability system 108 in a shared computing resource environment or as a cloud-based service can improve compute resource utilization. For example, in an on-premises environment if the designated compute resources are not being used by, they may sit idle and unused. In a shared computing resource environment, if the compute resources for a particular component are not being used, they can be re-allocated to other tasks within the observability system 108 and/or to other systems unrelated to the observability system 108.

As mentioned, in an on-premises environment, data from one instance of an observability system 108 is logically and physically separated from the data of another instance of an observability system 108 by virtue of each instance having its own designated hardware. As such, data from different customers of the observability system 108 is logically and physically separated from each other. In a shared computing resource environment, components of an observability system 108 can be configured to process the data from one customer or tenant or from multiple customers or tenants. Even in cases where a separate component of an observability system 108 is used for each customer, the underlying hardware on which the components of the observability system 108 are instantiated may still process data from different tenants. Accordingly, in a shared computing resource environment, the data from different tenants may not be physically separated on distinct hardware devices. For example, data from one tenant may reside on the same hard drive as data from another tenant or be processed by the same processor. In such cases, the observability system 108 can maintain logical separation between tenant data. For example, the observability system 108 can include separate directories for different tenants and apply different permissions and access controls to access the different directories or to process the data, etc.

In certain cases, the tenant data from different tenants is mutually exclusive and/or independent from each other. For example, in certain cases, Tenant A and Tenant B do not share the same data, similar to the way in which data from a local hard drive of Customer A is mutually exclusive and independent of the data (and not considered part) of a local hard drive of Customer B. While Tenant A and Tenant B may have matching or identical data, each tenant would have a separate copy of the data. For example, with reference again to the local hard drive of Customer A and Customer B example, each hard drive could include the same file. However, each instance of the file would be considered part of the separate hard drive and would be independent of the other file. Thus, one copy of the file would be part of Customer A's hard drive and a separate copy of the file would be part of Customer B's hard drive. In a similar manner, to the extent Tenant A has a file that is identical to a file of Tenant B, each tenant would have a distinct and independent copy of the file stored in different locations on a data store or on different data stores.

Further, in certain cases, the observability system 108 can maintain the mutual exclusivity and/or independence between tenant data even as the tenant data is being processed, stored, and searched by the same underlying hardware. In certain cases, to maintain the mutual exclusivity and/or independence between the data of different tenants, the observability system 108 can use tenant identifiers to uniquely identify data associated with different tenants.

In a shared computing resource environment, some components of the observability system 108 can be instantiated and designated for individual tenants and other components can be shared by multiple tenants. In certain implementations, the trace analyzer 110, the API service 116, the digest cache 112, the full fidelity trace data storage 106, etc. can be instantiated for each tenant or shared by multiple tenants. In some such implementations where components are shared by multiple tenants, the components can maintain separate directories for the different tenants to ensure their mutual exclusivity and/or independence from each other. Similarly, in some such implementations, the observability system 108 can use different hosting computing systems or different isolated execution environments to process the data from the different tenants as part of the trace analyzer 110, the API service 116, the digest cache 112, the full fidelity trace data storage 106, etc.

In some implementations, individual components of the trace analyzer 110, the API service 116, the digest cache 112, the full fidelity trace data storage 106, etc. may be instantiated for each tenant or shared by multiple tenants. For example, some individual intake system components (e.g., forwarders, output ingestion buffer) may be instantiated and designated for individual tenants, while other intake system components (e.g., a data retrieval subsystem, intake ingestion buffer, and/or streaming data processor), may be shared by multiple tenants.

In some cases, by sharing more components with different tenants, the functioning of the observability system 108 can be improved. For example, by sharing components across tenants, the observability system 108 can improve resource utilization, thereby reducing an amount of resources allocated as a whole.

Figure 2:
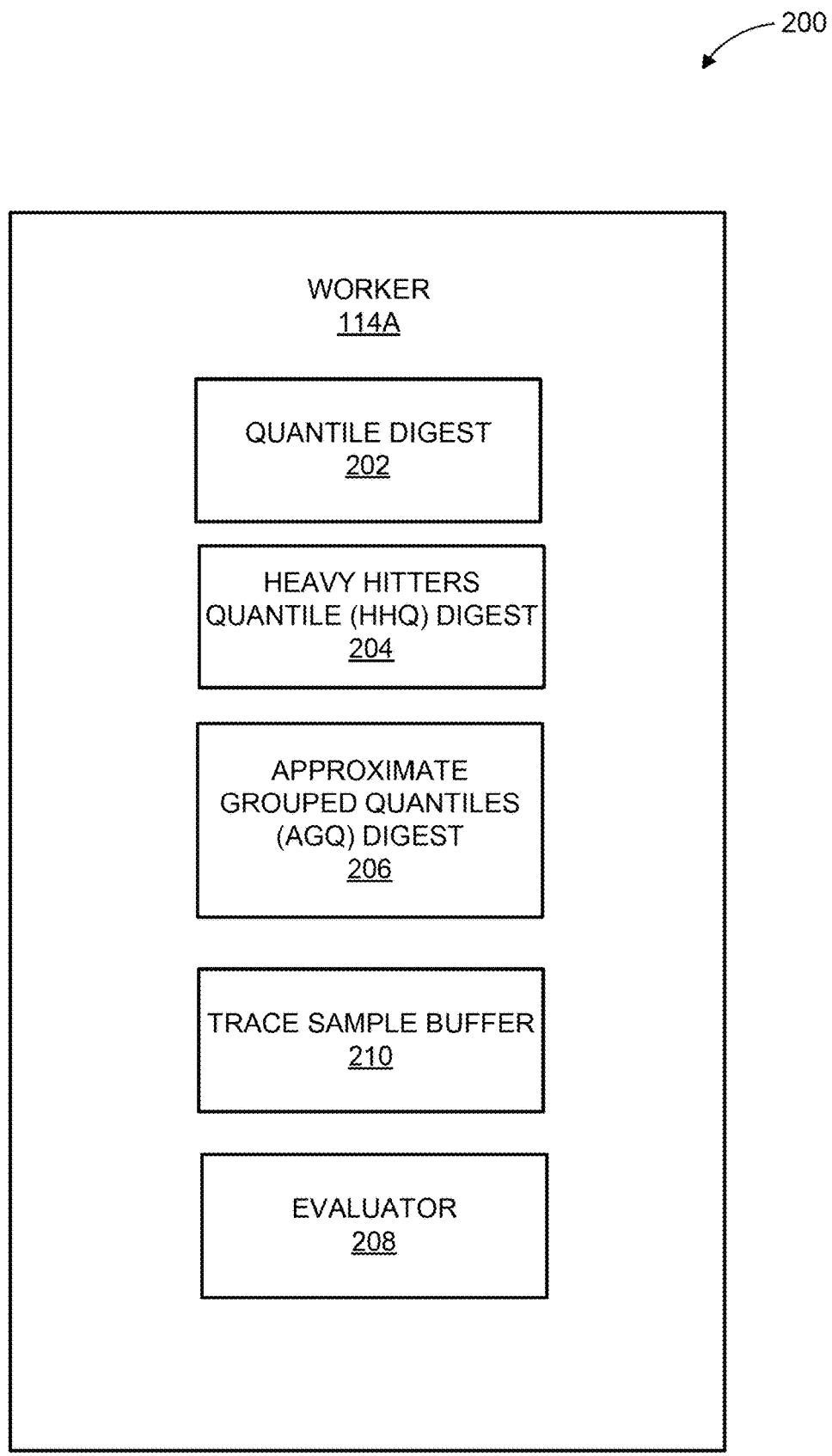
FIG. 2 illustrates exemplary components of a worker within the trace analyzer of FIG. 1, according to at least one implementation.

FIG. 2 illustrates exemplary components of a worker 114A within the trace analyzer 110 of FIG. 1, according to one exemplary implementation. Although a single worker 114A is shown, it should be noted that each of the group of workers 114A-N of FIG. 1 may have the same components as the exemplary worker 114A shown in FIG. 2. The worker 114A may include a compute instance, such as a predetermined allocation of compute resources, storage resources, networking resources, etc. For example, the worker 114A may include a computing system within a computing system, a container environment, a virtual machine, a computing thread, etc.

As shown, the worker 114A may include an evaluator 208 as well as four in memory data-structure components. This includes three approximate summary data structures that are also known as digests—a quantile digest 202, a heavy hitters quantiles (HHQ) digest 204, and an approximate grouped quantiles (AGQ) digest 206; additionally a trace sample buffer 210 is used to temporarily store a sample of example traces. Exemplary details of the evaluator 208, the digests 202-206 and the trace sample buffer 210 may be found in step 406 of FIG. 4.

Additionally, in one implementation, the evaluator 208 may receive a query (e.g., from an API service 116 of FIG. 1) as well as a stream of traces. The evaluator 208 may evaluate incoming traces and conditionally route the traces to one or more of the digests 202-206 or the trace sample buffer 210, based on the components of the query and traces. The digests 202-206 and trace sample buffer 210 may then be updated based on the traces that are routed to the digests 202-206. The digests 202-206 and trace sample buffer 210 may then be output by the evaluator 208. For example, the evaluator 208 may send the digests 202-206 to the API service 116 of FIG. 1. Exemplary details of the use of digests 202-206 and trace sample buffer 210 to process traces may be found in FIG. 4.

In this way, each of the digests 202-206 may store summarized results of resolving a query against trace data for a predetermined data set. Additionally the trace sample buffer 210 will store a sampled subset of example traces.

Figure 3:
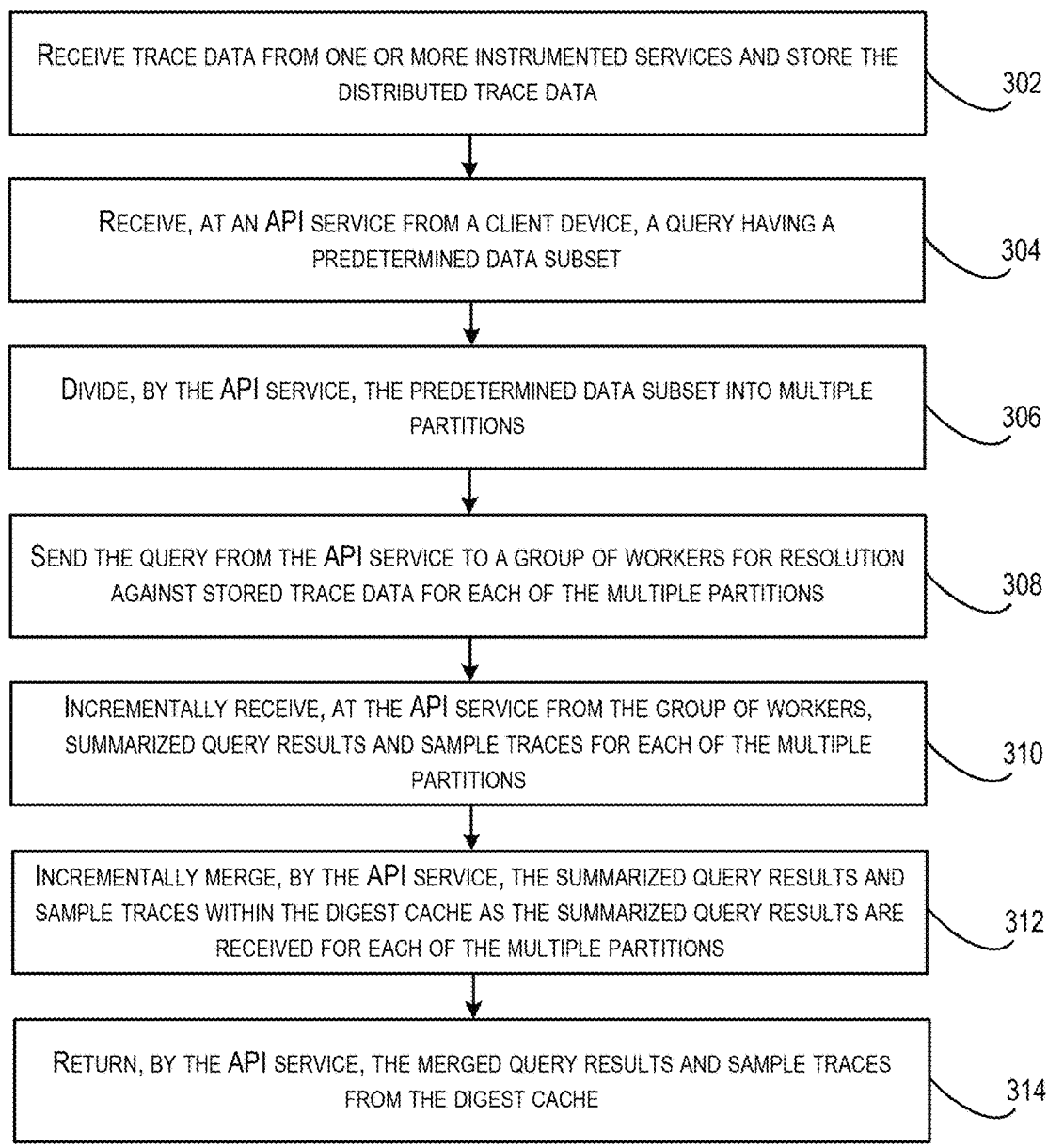
FIG. 3 illustrates an example method for analyzing trace data, according to at least one implementation.

FIG. 3 illustrates an example method 300 for analyzing trace data, according to at least one implementation. The method 300 may be performed by one or more components of FIGS. 1, 2, and 5. A computer-readable storage medium comprising computer-readable instructions that, upon execution by one or more processors of a computing device, cause the computing device to perform the method 300. The method 300 may be performed in any suitable order. It should be appreciated that the method 300 may include a greater number or a lesser number of steps than that depicted in FIG. 3.

The method 300 may begin at 302, where trace data is received from one or more instrumented services, and the received trace data are stored. In one implementation, each of the instrumented services may include a monitoring agent that monitors data input to and output by the instrumented service. For example, the service may include one or more hardware and/or software components. In another example, the monitoring agent may include software that is installed within the service (e.g., that "instrument" the service).

Additionally, in one implementation, the trace data (also known herein as "traces") may be sent from the monitoring agents of the instrumented services to an analysis system (such as the observability system 108 of FIG. 1, etc.). For example, the trace data may be stored in a full-fidelity trace storage location within the analysis system (such as the trace data storage 106 of FIG. 1, etc.). In one implementation, each instance of trace data may include details of a transaction that propagates from one service to another within a computing environment.

Further, in one implementation, this transaction may include an end-to-end request-response flow, starting with the sending of an initial request and ending with the receipt of a final response to such request. In one implementation, each instance of trace data may follow a course of a transaction from its source to its ultimate destination in a computing environment. In one implementation, each instance of trace data may be conceptualized as a highly dimensional structured log that captures a full graph of user-generated and background request execution and which contains information about interactions as well as causality.

Further still, in one implementation, each instance of trace data may include a plurality of spans, where each span may indicate an individual unit of work performed during a particular transaction. In one implementation, each span may be provided with associated tags. For example, these tags may include data such as a unique span identifier (ID), a service name, an operation name, a duration (e.g., a latency between the sending of a query to a database and the receipt of a response from the database), start and end timestamps, a location/region, etc.

Also, at 304, a query having a predetermined data subset is received at an application program interface (API) service from a client device. In one implementation, the API service may include one or more applications within the analysis system that manage search requests within the analysis system. In one implementation, the query may be received from a client device. For example, the query may be received from a user interface (UI) implemented within the client device.

In addition, in one implementation, the query may include one or more tag filters. For example, each of the tag filters within the query may indicate one or more criteria by which the trace data is to be filtered. In another example, the tag filters may include a particular user identifier, a location/region, etc. In one implementation, the query may include one or more operation filters. In one implementation, the query may include a request for density measurements (such as a density of traces/latency at a given time (i.e., W traces with latency from X to Y seconds, at time Z)). For example, the query may include a request for a latency heat map.

Furthermore, in one implementation, the query may include grouping criteria. For example, the query may include a request for one or more frequency-based rankings for one or more tag values. For instance, the query may include a request for a ranking of one or more tags by the number of matching traces within the predetermined data subset. In another example, the query may include a request for one or more latency-based rankings for one or more tag values. For instance, the query may include a request for a ranking of one or more tags by the latency percentile estimate (such as a P50 value, P90 value, P99 value, etc.) within the predetermined data subset.

Further still, in one implementation, the predetermined data subset may be defined by a predetermined time range and include a predetermined start time and a predetermined end time. In one implementation, the predetermined time range used to determine the predetermined data subset may include a constraint for traces that are retrieved and analyzed.

Also, at 306, the API service divides the predetermined data subset into multiple partitions. In order to reconcile disparate distributions, the merge operation applied to each digest will result in a recalibrated global distribution. In this way, the UI can dynamically adjust incremental rendering of query results from multiple intervals. Also, the data subset may be divided into partitions based on one or more attributes of the data subset, such as start time, time range, response code, country code, customer name, latency, error message, organization identifier, unique object identifier, etc.

Figure 4:
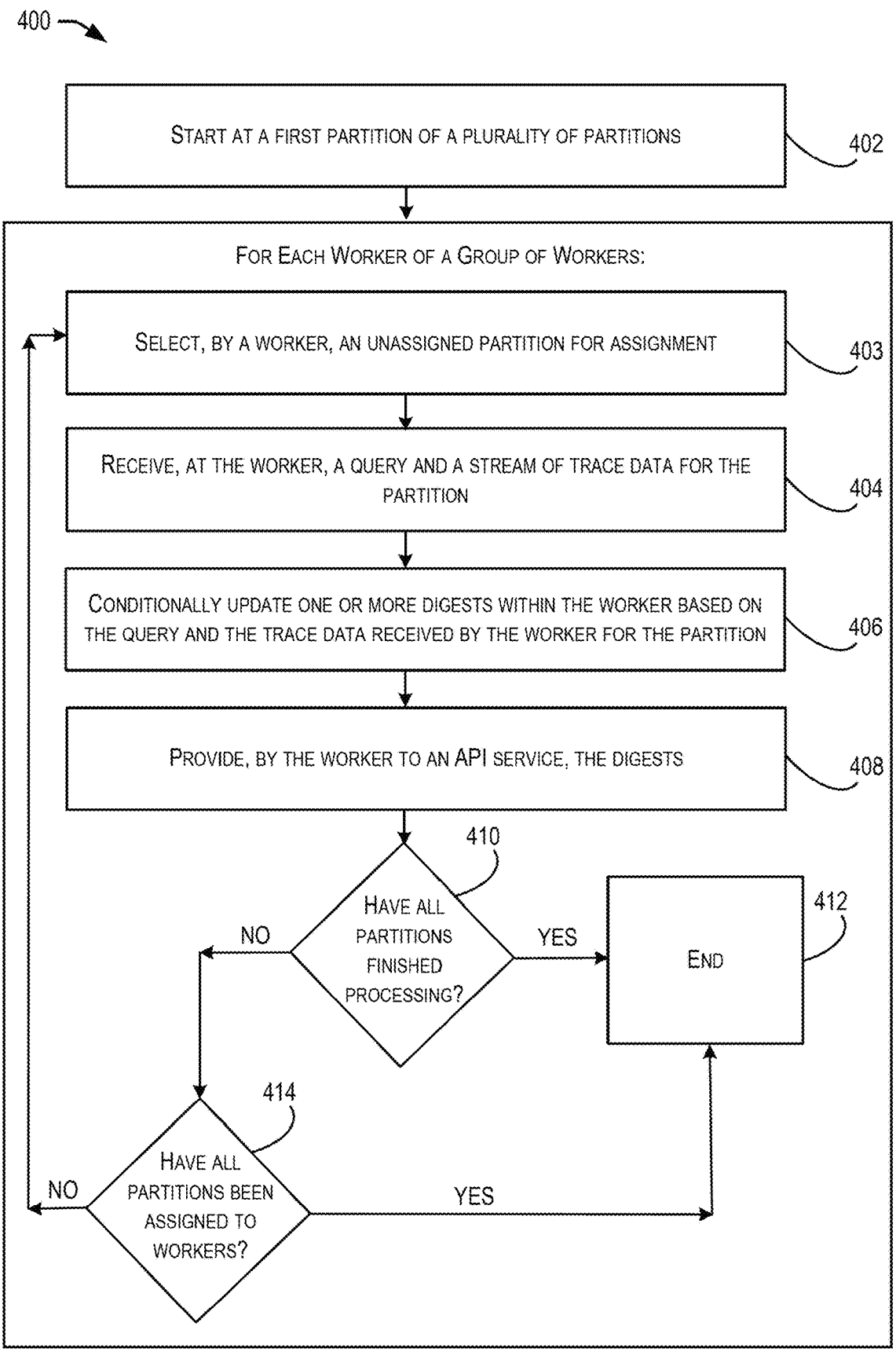
FIG. 4 illustrates an example method for updating worker digests based on query criteria and input traces, according to at least one implementation.

Additionally, at 308, the query is sent from the API service to a group of workers for resolution against stored trace data for each of the multiple partitions. In one implementation, using time intervals as partitions, starting at a most recent time interval and proceeding to a last recent time interval, the group of workers may resolve the query against stored trace data for the corresponding time interval. Resolving the query may include identifying and returning information within the stored trace data that matches criteria found within the query. Additional details regarding this step are shown in FIG. 4. In one implementation, the workers may each include a predetermined portion of compute and storage resources within the analysis system.

Further, at 310, summarized query results and sample traces for each of the multiple partitions are incrementally received at the API service from the group of workers. In one implementation, using time intervals as partitions, starting at a most recent time interval and proceeding to a last recent time interval, the group of workers may send query results for each time interval to the API service. In one implementation, the query results may be in the form of binary streams received at the API service from the workers.

Further still, in one implementation, the API service may deserialize the binary streams into digests that are stored in memory of the API service. For example, the digests may include one or more of a quantile digest, a heavy hitters quantiles (HHQ) digest, an approximate grouped quantiles digest, etc. These binary streams will also include the full unaggregated details of sampled traces from the trace sample buffer.

Also, at 312, the API service incrementally merges the summarized query results (e.g., the approximate summary data structures) and the sample traces within the digest cache as the summarized query results are received for each of the multiple partitions. In one implementation, the digest cache may include a memory for storing merged query results. Merging the sample traces may include appending sample traces to each other. In one implementation, using time intervals as partitions, when summarized query results are received by the API service for the first (most recent) time interval, the digest cache may not have any stored digests or sampled example traces for the query. In one implementation, after deserializing the binary streams to create initial digests for the first time interval, the API service may store the digests and sampled example traces for the first time interval in the digest cache.

In addition, in one implementation, using time ranges for partitioning, when summarized query results are received by the API service for the second (next most recent) time interval, the digest cache may retrieve the digests and sampled example traces for the first time interval from the digest cache. In one implementation, using time intervals as partitions, after deserializing the binary streams to create digests and sampled example traces for the second time interval, the API service may merge the digests for the second time interval with the digests for the first time interval to create merged digests; similarly any additionally sampled example traces are added. In one implementation, using time intervals as partitions, the API service may then replace the digests for the first time interval with the merged digests for the first and second time intervals within the digest cache. In one implementation, using time intervals as partitions, this merging may continue for each of the multiple time intervals. Contrary to the merge operations of aggregated digests, which depend on the specific type of digest, addition of sampled example traces from each time interval are simply appended to the set of existing sampled example traces.

Furthermore, at 314, the API service returns the merged query results and sample traces from the digest cache. In one implementation, the client device may periodically poll the API service for updates to the query. In one implementation, each time a polling request is received from the client device for the query, the API service may retrieve and return the latest merged query results (e.g., merged digests, sampled example traces) from the digest cache. In one implementation, the API service may present the merged query results by generating one or more visual representations of the results, such as using one or more tables, graphs, etc. Examples of these results may be seen in FIGS. 12-14.

In this way, the API service may divide a query into partitioned portions and may orchestrate the incremental implementation of these portions by a group of workers. These workers may create summarized query results from large quantities of stored trace data and may pass these summarized results back to the API service, where they are merged and stored/returned. This incremental creation and merging of summarized search results may reduce an amount of data storage and compute resources needed to resolve a search query against a large quantity of trace data, which may improve a performance of computing hardware performing such search.

FIG. 4 illustrates an example method 400 for updating worker digests based on query criteria and input traces, according to at least one implementation. The method 400 may be performed by one or more components of FIGS. 1, 2, and 5. A computer-readable storage medium comprising computer-readable instructions that, upon execution by one or more processors of a computing device, cause the computing device to perform the method 400. The method 400 may be performed in any suitable order. It should be appreciated that the method 400 may include a greater number or a lesser number of steps than that depicted in FIG. 4.

The method 400 may begin at 402, where the method is started at the first partition of a plurality of partitions. The definition of "first" may be defined in any of numerous ways, such as through lexicographical ordering, numeric ordering, location on disk, or removal ordering from a nondeterministically sorted collection. For example, the partitions may be created by an API service (see, for example, step 306 of FIG. 3). Additionally, steps 403-414 are performed for each worker of a group of workers. At step 403, a worker selects an unassigned partition for assignment. At step 404, a query and a stream of trace data for the partition are received at the worker. In one implementation, the query may be received from an API service (such as the API service 116 of FIG. 1). In one implementation, the query may include one or more tags. In one implementation, each of the workers may receive a stream of traces that are different from the traces in the streams received by the other workers.

Additionally, in one implementation, the query may include a request for one or more measurements, one or more rankings, etc. Step 304 of FIG. 3 provides various examples of components of a query. In one implementation, for each worker within the group, the query may be received at an evaluator within the worker (such as the evaluator 208 of FIG. 2). In one implementation, the stream of trace data may include instances of trace data streamed from a full-fidelity trace storage location within the analysis system (such as the trace data storage 106 of FIG. 1, etc.) to the group of workers. For example, each of the workers may receive a stream of trace data that is different from the other streams of trace data received by the other workers.

Further, at 406, one or more digests within the worker are conditionally updated based on the query and the trace data received by the worker for the partition. This conditional update may be performed utilizing logic within each of the digests. In one implementation, within each worker, the evaluator for that worker may receive a stream of trace data. The evaluator may include an instance of software within the worker that evaluates incoming traces and conditionally routes the traces to one or more digests. A bounded number of such traces passing the evaluator may also be stored in the trace sample buffer.

Further still, in one implementation, as each instance of trace data is received by the evaluator, the evaluator may determine whether the instance of trace data (also known as "trace") meets one or more criteria included within the query. For example, the query may include one or more tag filters and one or more operation filters. In another example, the one or more digests may include a quantile digest (such as the quantile digest 202 of FIG. 2), an HHQ digest (such as the HHQ digest 204 of FIG. 2), and an AGQ digest (such as the AGQ digest 206 of FIG. 2), Also, in one example, as each trace is received, the evaluator may determine whether the trace meets the one or more tag filters, the one or more operation filters, etc. For instance, the trace may meet a tag filter if the trace includes a tag that matches the tag filter. In another example, the trace may meet an operation filter if the trace includes an operation that matches the operation filter. In yet another example, the trace may be discarded by the evaluator in response to determining that the trace does not meet the one or more tag filters, the one or more operation filters, etc.

In addition, in one implementation, the trace may be passed to a quantile digest within the worker by the evaluator in response to determining that the trace meets the one or more tag filters, the one or more operation filters, etc. For example, the quantile digest may store density measurements (e.g., a number of traces that appear with a predetermined duration (e.g., latency) for a given time period). In another example, the quantile digest may be updated based on data within the trace.

Furthermore, in one implementation, as each trace is received, the evaluator may determine whether the trace includes a tag value that is included within grouping criteria of the query. For example, it may be determined whether the trace includes a tag value for which one or more grouping operations are requested by the query. In one implementation, the trace may be passed to an HHQ digest and an approximate grouped quantiles digest in response to determining that the trace includes a tag value that is included within grouping criteria of the query (or in response to determining that the trace does not have the tag value, determining that the trace is categoryless, etc.).

For example, the HHQ digest may store tag values (such as one or more of user ID, location, etc.) that are ranked by a request rate (such as a number of traces that match each tag value for a predetermined time period). In another example, the AGQ digest may store tag values (such as one or more of user ID, location, etc.) that are ranked by latency (such as a latency percentile estimate for each tag value for a predetermined time period). In yet another example, the HHQ digest and the AGQ digest may be updated based on data within the trace. More specific implementation details for the AGQ digest are found in FIGS. 6-8.

In this way, the one or more digests may create summaries of query results for the traces within the partition. This may reduce an amount of memory/storage space necessary to store such query results.

Also, at 408, the worker provides the digests to an API service. In one implementation, for each worker, after the worker has processed the trace data received by the worker for the partition, the digests and sampled example traces stored by the worker (that were conditionally updated during the processing) may be returned (e.g., from the evaluator of the worker) to the API service. In another implementation, the digests and samples may be sent as binary streams from the workers to the API service.

Additionally, at decision 410, it is determined whether all partitions have finished processing. For example, the partitions may be created by an API service (see, for example, step 306 of FIG. 3). If it is determined in decision 410 that all partitions have finished processing, then at step 412 the worker ceases processing and the method 400 ends for that worker.

However, if it is determined in decision 410 that all partitions have not finished processing, then at decision 414 it is determined whether all partitions have been assigned to workers. If it is determined in decision 414 that all partitions have been assigned to workers, then at step 412 the worker ceases processing and the method 400 ends for that worker. If it determined in decision 414 that all partitions have been assigned to workers, then at step 403 another unassigned partition is selected by the worker for assignment.

In this way, digests may be created for each partition, where the digests contain summaries of query results for that partition.

Figure 5:
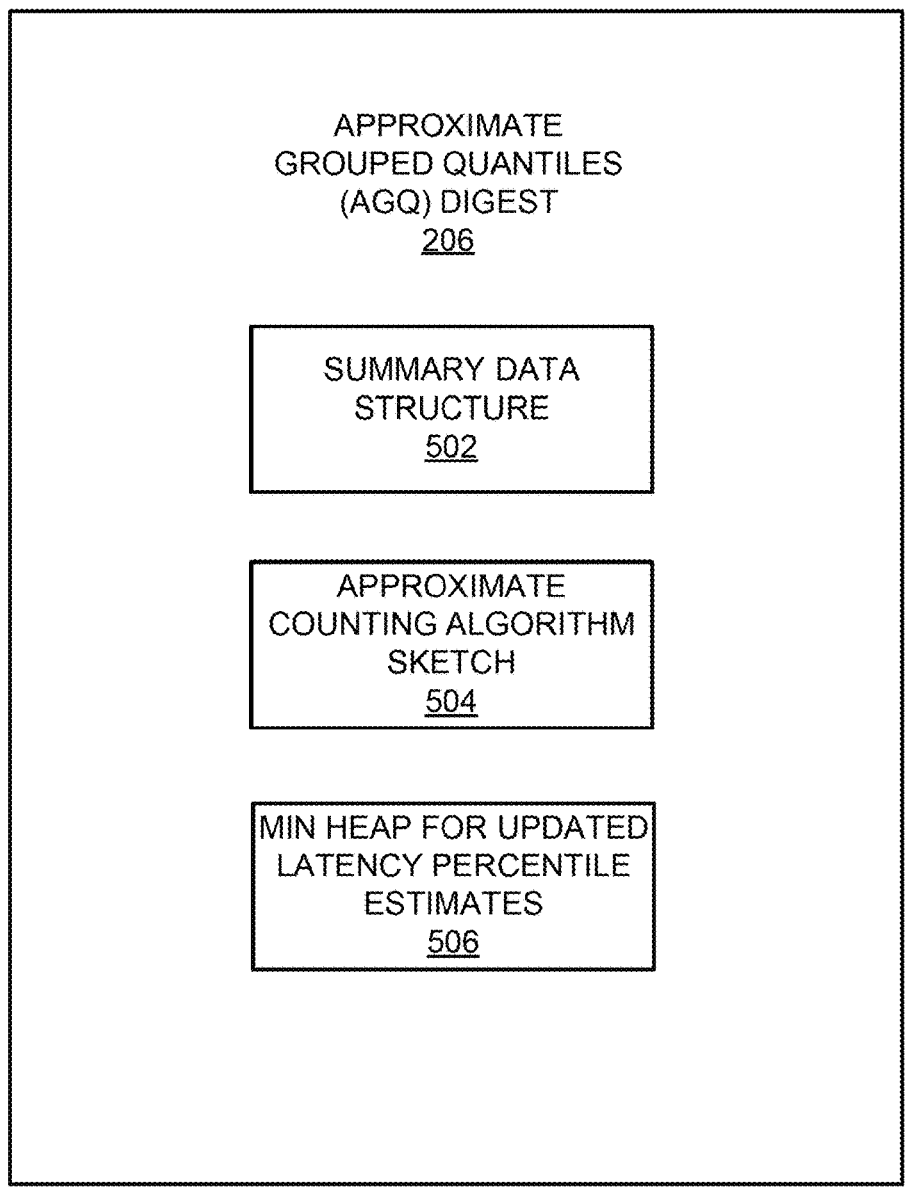
FIG. 5 illustrates exemplary components of the AGQ digest of FIG. 2, according to at least one implementation.

FIG. 5 illustrates exemplary components of the AGQ digest 206 of FIG. 2, according to one exemplary implementation. In one implementation, the AGQ digest 206 may be used by a worker (such as the worker 114A of FIG. 2) to resolve a latency request (such as a request for a ranking by latency percentile) within a received query.

Figure 7:
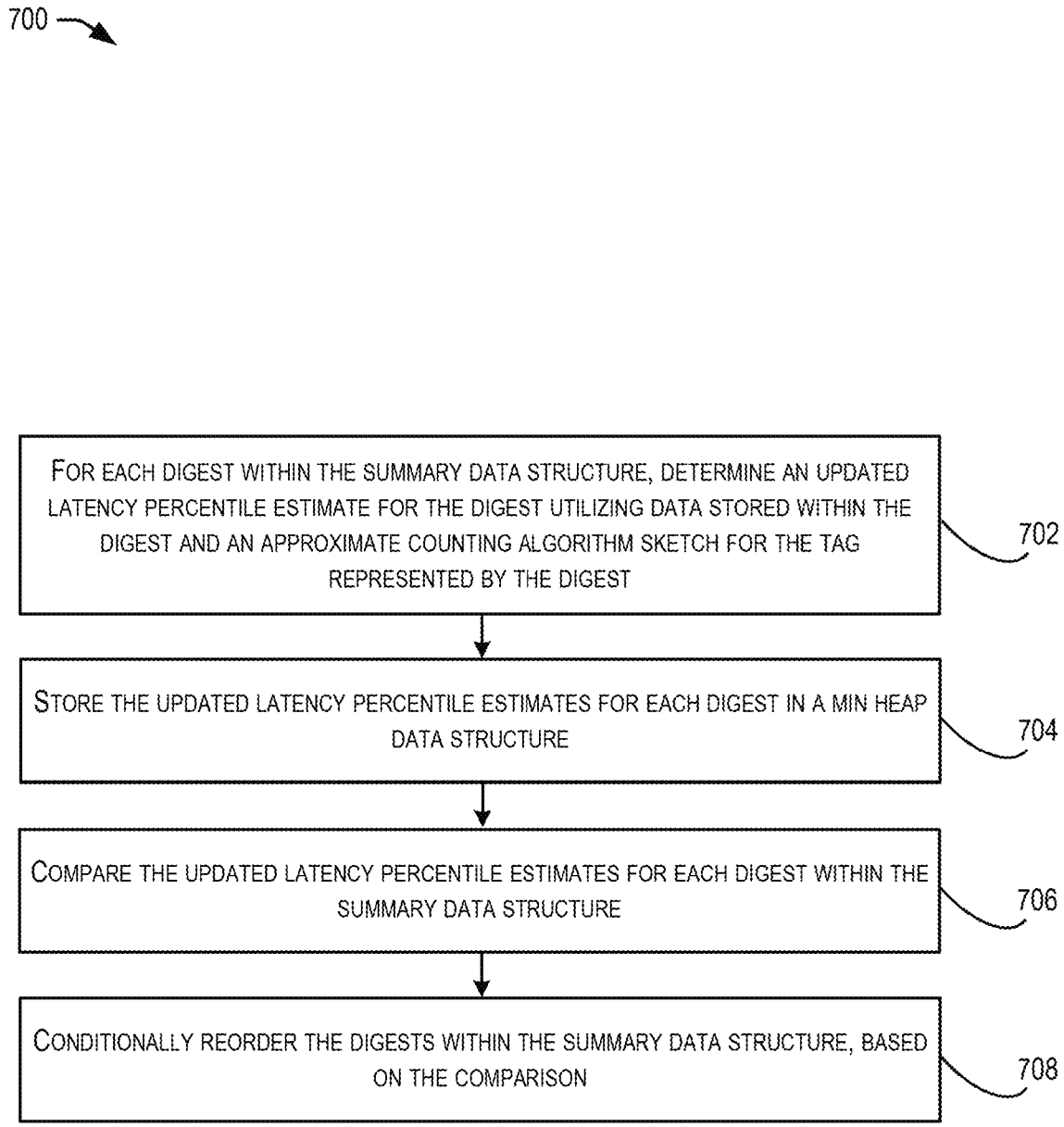
FIG. 7 illustrates an example method for conditionally reordering digests within a summary data structure, according to at least one implementation.
Figure 8:
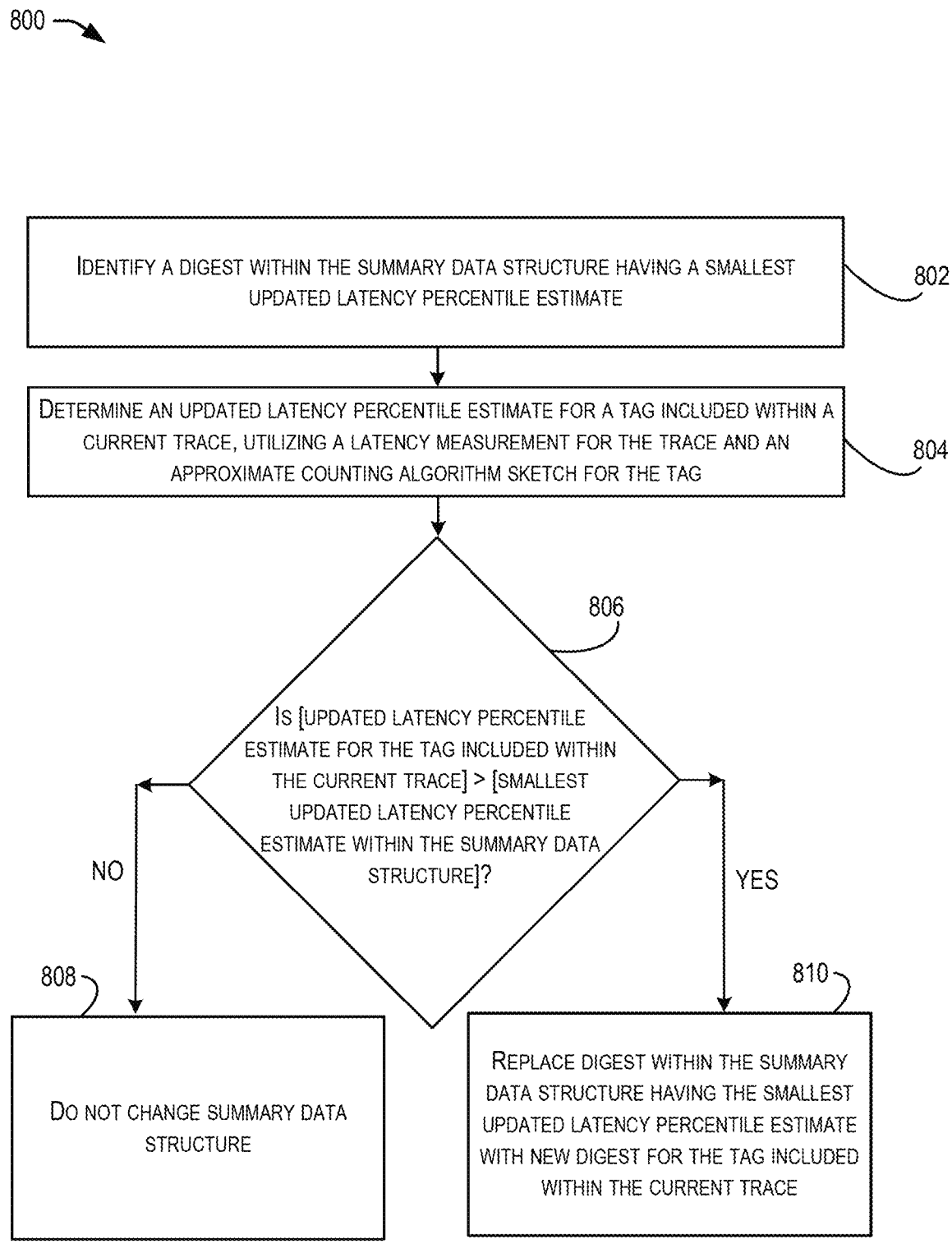
FIG. 8 illustrates an example method for conditionally replacing a digest within the summary data structure with a new digest for a tag, according to at least one implementation.

As shown, the AGQ digest 206 includes a summary data structure 502, an approximate counting algorithm sketch 504 (such as a SpaceSaving sketch), and a min heap for updated latency percentile estimates 506. These components of the AGQ digest 206 may be used by a worker to resolve a latency request within a received query, as shown in FIGS. 6-8.

Figure 6:
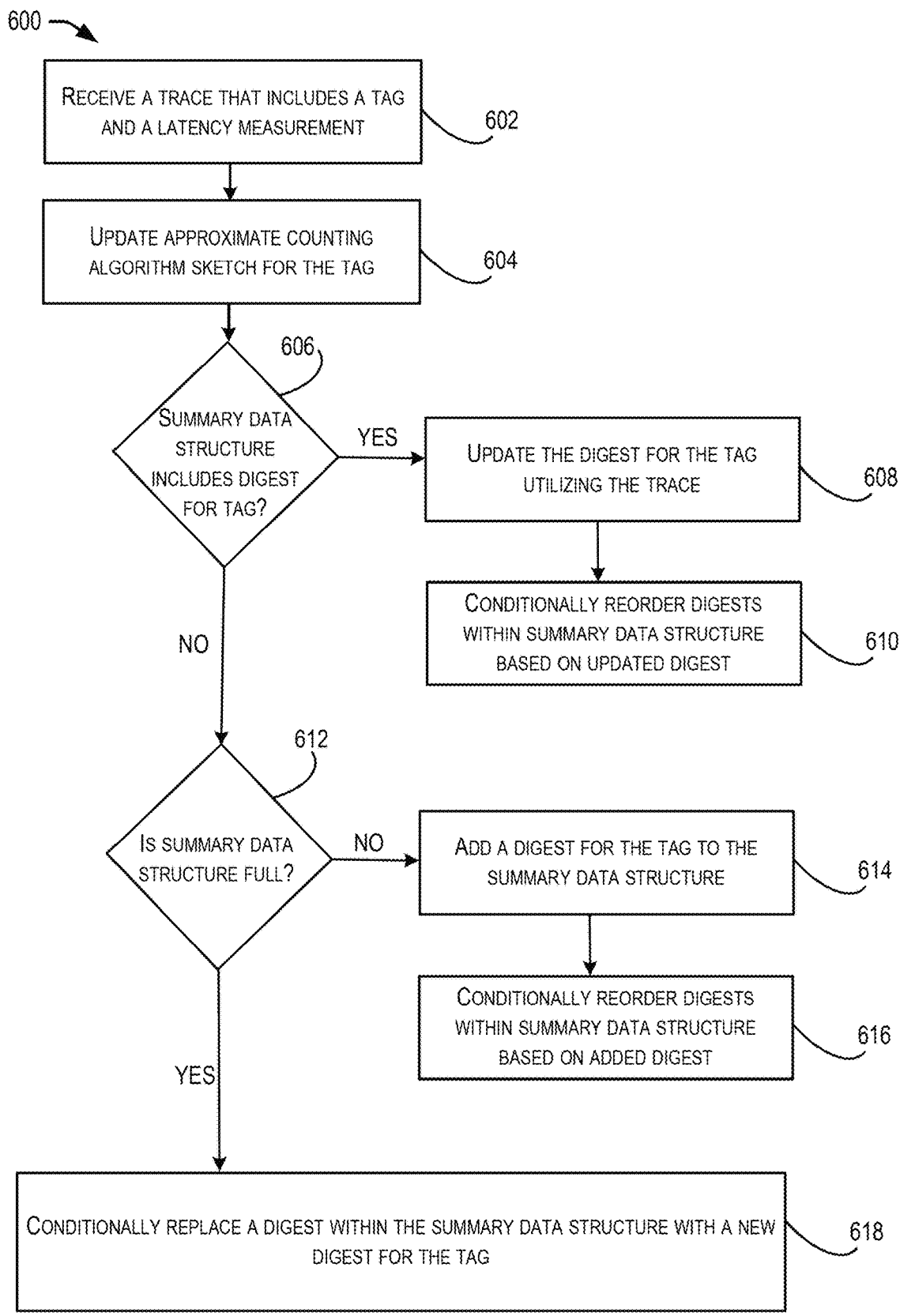
FIG. 6 illustrates an example method for creating summarized results while resolving a query against trace data utilizing an AGQ digest, according to at least one implementation.

FIG. 6 illustrates an example method 600 for creating results while resolving a query against trace data utilizing an AGQ digest, according to at least one implementation. The method 600 may be performed by one or more components of FIGS. 1, 2, and 5. A computer-readable storage medium comprising computer-readable instructions that, upon execution by one or more processors of a computing device, cause the computing device to perform the method 600. The method 600 may be performed in any suitable order. It should be appreciated that the method 600 may include a greater number or a lesser number of steps than that depicted in FIG. 6.

The method 600 may begin at 602, where a trace that includes a tag and a latency measurement is received. In one implementation, the trace (also known as an "instance of trace data") may be received from a full-fidelity trace storage location within the analysis system (such as the trace data storage 106 of FIG. 1, etc.). In one implementation, the trace may be one of a stream of traces for a predetermined time interval.

Additionally, in one implementation, the trace may be received at an evaluator (such as the evaluator 208 of FIG. 2) of a worker (such as a worker 114A-N of FIG. 1). In one implementation, the evaluator may determine that the trace includes a tag value that is included within grouping criteria of a query received by the worker. For example, the query may include a request for a latency ranking. For instance, the query may include a request for the top N tags sorted by a latency percentile estimate (such as a P50 value, a P90 value, a P99 value, etc.). A PX value may include a value for a distribution, where X % of values within the distribution will be less than or equal to the PX value (or, the PX value will meet or exceed X % of the values within the distribution).

Further, in one implementation, in response to such determination, the evaluator may then pass the trace to an AGQ digest of the worker (such as the AGQ digest 206 of FIG. 2), where the AGQ digest is conditionally updated based on predetermined criteria (illustrated herein). In one implementation, the tag may include one key or a group of keys (where each key includes information such as a user ID, a location, etc.).

Further still, at 604, an approximate counting algorithm sketch for the tag is updated in response to receiving the trace. In one implementation, the approximate counting algorithm sketch may include a data structure within the AGQ digest (e.g., the approximate counting algorithm sketch 504 of FIG. 5). In one implementation, the approximate counting algorithm sketch may include a probabilistic data structure that stores a frequency of tags within a stream of traces. In one implementation, the approximate counting algorithm sketch may use one or more hash functions to map tags to frequencies.

Also, at decision 606 it is determined whether a summary data structure includes a digest for the tag. In one implementation, the summary data structure may include a group of digest entries. In one implementation, each digest entry within the summary data structure may be associated with a predetermined tag. In one implementation, each digest entry may include a t-digest that stores a number of traces identified with the predetermined tag (e.g., during the existence of the t-digest), a number of centroids, and a latency percentile estimate (such as a PX value) for the tag within the t-digest.

In addition, in response to determining at decision 606 that the summary data structure does include a digest for the tag, at 608 the digest for the tag is updated utilizing the trace, and at 610 the digests within the summary data structure are conditionally reordered based on the updated digest. In one implementation, within the digest for the tag, the number of traces identified may be incremented, the number of centroids may be adjusted, and the latency percentile estimate for the tag may be updated based on the latency measurement for the trace. Details regarding the conditional reordering of digests within the summary data structure can be found in FIG. 7.

Furthermore, in response to determining at decision 606 that the summary data structure does not include a digest for the tag, at decision 612 it is determined whether the summary data structure is full. For example, the summary data structure may be determined to be full in response to determining that the summary data structure does not contain any empty locations for new digests. In response to determining at decision 612 that the summary data structure is not full, at 614 a digest for the tag is added to the summary data structure, and at 616 the digests within the summary data structure are conditionally reordered based on the added digest. For example, within the digest for the tag, the number of traces identified may be set to one, the number of centroids may be set to one, and the latency percentile estimate for the tag may be set based on the latency measurement for the trace. Details regarding the conditional reordering of digests within the summary data structure can be found in FIG. 7.

Further still, in response to determining at decision 612 that the summary data structure is not full, at 618 a digest within the summary data structure is conditionally replaced with a new digest for the tag. Details regarding this conditional replacement within the summary data structure can be found in FIG. 8.

In one implementation, the steps performed in FIG. 6 may be repeated for all traces within a stream of traces for a predetermined time interval that are passed to the summary data structure by the evaluator.

FIG. 7 illustrates an example method 700 for conditionally reordering digests within a summary data structure, according to at least one implementation. The method 700 may be performed by one or more components of FIGS. 1, 2, and 5. A computer-readable storage medium comprising computer-readable instructions that, upon execution by one or more processors of a computing device, cause the computing device to perform the method 700. The method 700 may be performed in any suitable order. It should be appreciated that the method 700 may include a greater number or a lesser number of steps than that depicted in FIG. 7.

The method 700 may begin at 702, where for each digest within the summary data structure, an updated latency percentile estimate is determined for the digest utilizing data stored within the digest and an approximate counting algorithm sketch for the tag represented by the digest. In one implementation, the summary data structure may include a group of digest entries. In one implementation, each digest entry within the summary data structure may be associated with a predetermined tag. In one implementation, each digest entry may include a t-digest that stores a number of traces identified with the predetermined tag (e.g., during the existence of the t-digest), a number of centroids, and a latency percentile estimate (such as a PX value) for the tag within the t-digest.

Additionally, in one implementation, for each digest within the summary data structure, the updated latency percentile estimate for the digest may be determined by adjusting the latency percentile estimate within the digest, utilizing the number of traces, the number of centroids, and the approximate counting algorithm sketch for the tag represented by the digest. For example, as the approximate counting algorithm sketch for a tag increases in size, the latency percentile estimate for the digest associated with the tag is decreased by a greater amount to determine the updated latency percentile estimate for the digest.

Further, at 704, the updated latency percentile estimates for each digest are stored in a min heap data structure. In one implementation, updated latency percentile estimates may be determined for each digest each time the digest is updated in response to a received trace. In one implementation, the min heap data structure may include a heap data structure that is organized as a binary tree.

Further still, at 706, the updated latency percentile estimates for each digest within the summary data structure are compared. In one implementation, the updated latency percentile estimates for each digest may be retrieved from the min heap data structure.

Also, at 708, the digests within the summary data structure are conditionally reordered based on the comparison. In one implementation, the digests may be ordered according to updated latency percentile estimates within the summary data structure (e.g., starting with a largest updated latency percentile estimate and proceeding in order to a smallest updated latency percentile estimate). In one implementation, in response to determining that a first digest has an updated latency percentile estimate with a greater value than the updated latency percentile estimate of a second digest, the first digest may be ranked above/before the second digest within the summary data structure.

FIG. 8 illustrates an example method 800 for conditionally replacing a digest within the summary data structure with a new digest for a tag, according to at least one implementation. The method 800 may be performed by one or more components of FIGS. 1, 2, and 5. A computer-readable storage medium comprising computer-readable instructions that, upon execution by one or more processors of a computing device, cause the computing device to perform the method 800. The method 800 may be performed in any suitable order. It should be appreciated that the method 800 may include a greater number or a lesser number of steps than that depicted in FIG. 8.

The method 800 may begin at 802, where a digest is identified within the summary data structure that has a smallest updated latency percentile estimate (e.g., when compared to all digests within the summary data structure). In one implementation, the summary data structure may include a group of digest entries. In one implementation, each digest entry within the summary data structure may be associated with a predetermined tag. In one implementation, an updated latency percentile estimate may be determined for each digest (an exemplary updating of a latency percentile estimate is found at step 702 of FIG. 7). In one implementation, the updated latency percentile estimates for all digests within the summary data structure may be compared to determine the summary data structure having the smallest updated latency percentile estimate.

Additionally, at 804, an updated latency percentile estimate is determined for a tag included within a current trace that is not currently in the summary data structure, utilizing a latency measurement for the trace and an approximate counting algorithm sketch for the tag. In one implementation, the updated latency percentile estimate for the tag may be determined by adjusting the latency measurement within the trace, utilizing the approximate counting algorithm sketch for the tag. For example, as the approximate counting algorithm sketch for a tag increases in size, the latency measurement for the tag is decreased by a greater amount to determine the updated latency percentile estimate for the tag.

Further, at decision 806, it is determined whether the updated latency percentile estimate for the tag included within the current trace is greater than the smallest updated latency percentile estimate within the summary data structure. In response to determining at decision 806 that the updated latency percentile estimate for the tag included within the current trace is not greater than the smallest updated latency percentile estimate within the summary data structure, then at 808 the summary data structure is not changed.

However, in response to determining at decision 806 that the updated latency percentile estimate for the tag included within the current trace is greater than the smallest updated latency percentile estimate within the summary data structure, them at 810 the digest within the summary data structure having the smallest updated latency percentile estimate is replaced with a new digest created for the tag included within the current trace. After the replacement, the digests within the summary data structure may be reordered (e.g., according to the implementation shown in FIG. 7, etc.).

Also, in one implementation, a current smallest tag (measured by some predetermined percentile) may be determined in the summary data structure. This current smallest tag may be conditionally replaced with a tag included within a current trace that is not currently in the summary data structure, according to the probability that a randomly drawn latency from the current trace's tag is greater than a randomly drawn latency from the current smallest tag. This probability may be computed using an approximate counting algorithm sketch (such as a SpaceSaving sketch) evaluated at both the current and candidate tag as well as a t-digest of the current tag (part of the summary data structure).

Trace Analyzer

A trace analyzer includes a system to aid software developers and system operators in understanding the health and performance of distributed and/or non-distributed systems. Directional insights may be provided by analyzing statistical characteristics over a given corpus of tracing data. The following capabilities are examples of capabilities that may be simultaneously supported: Correlated aggregate views over Request-Rate and Duration metrics for Traces, a scalable, horizontally, distributed architecture, and interactive response-time for analysis of billions of traces.

More specifically, "visual hypothesis testing" for system operators may be improved so such operators may understand the correlation between request-rate and duration in the context of other variables influencing a system's health/performance. This visual hypothesis testing, with a human in the loop, is often referred to as exploratory or interactive analytics. In contrast to completely automated approaches, exploratory analytics allows for domain experts of particular systems to combine their own domain knowledge with computer-aided automation.

The questions answered by the trace analyzer may include the following: How is Duration affected by the Context?How is Request-Rate affected by the Context?How is the correlation between Request-Rate and Duration affected by the Context?

Figure 10:
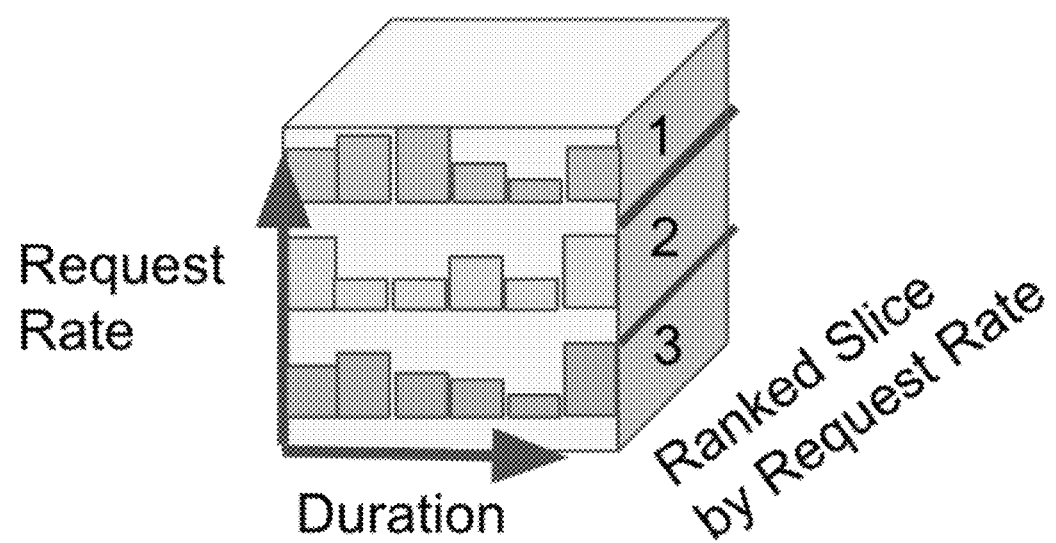
FIG. 10 illustrates a trace cube subspace ranking slices by request rate, according to at least one implementation.
Figure 11:
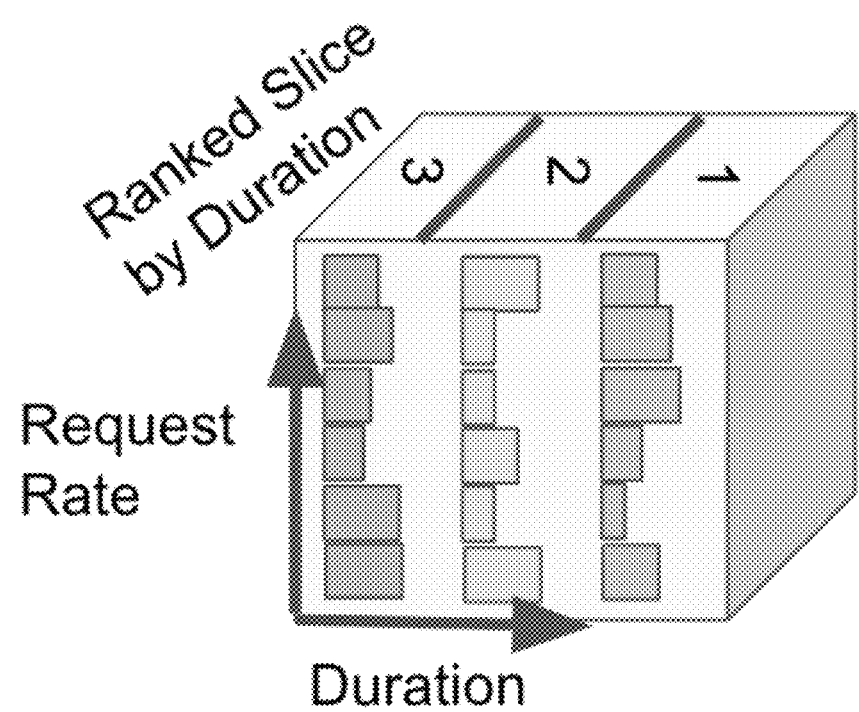
FIG. 11 illustrates a trace cube subspace ranking slices by latency, according to at least one implementation.

The trace analyzer aids in answering these questions through three cube operations: filtering (FIG. 9), ranking by request rate (FIG. 10), and ranking by latency (FIG. 11).

Figure 9:
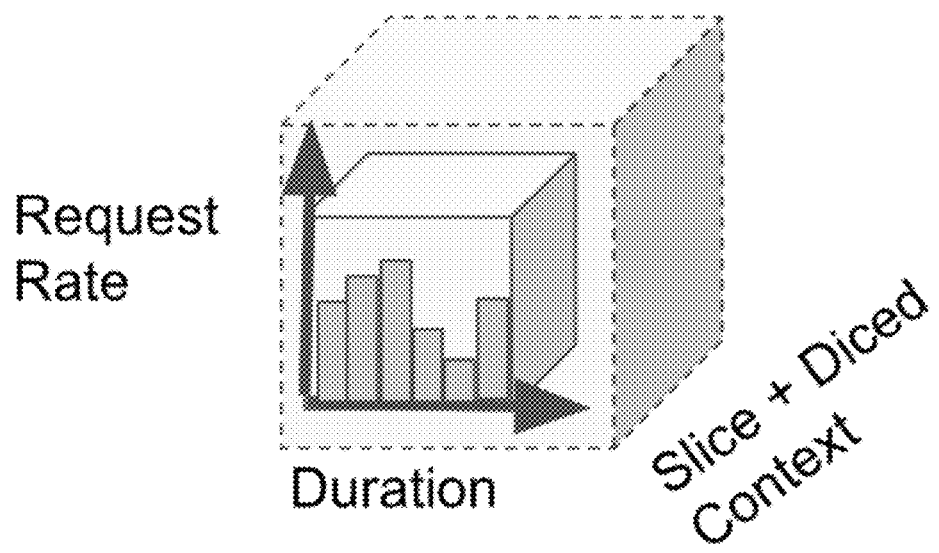
FIG. 9 illustrates a trace cube subspace with a trace view of the (request rate×latency) plane, according to at least one implementation.

FIG. 9 illustrates a trace cube subspace 900 with a trace view of the (request rate×latency) plane, according to at least one implementation. In one implementation, the trace cube may include a two-dimensional plane of (Request-Rate× Duration), extended by a dynamic set of multiple dimensions ("the Context"). Filtering dimensions of the context on specific values (slicing) or ranges (dicing) provides an aggregate projection of the (request rate×latency) plane. The trace cube subspace in FIG. 9 represents the application of filtering, and the 2-dimensional "histogram-like" image represents a custom aggregate projection called the trace view.

FIG. 10 illustrates a trace cube subspace 1000 ranking slices by request rate, according to at least one implementation. In one implementation, a partitioned slicing of the (request rate×latency) plane is provided. All possible slices over that dimension are ranked by highest request rate and the top k (e.g., top 100, etc.) slices are provided.

FIG. 11 illustrates a trace cube subspace 1100 ranking slices by latency, according to at least one implementation. In one implementation, a partitioned slicing of the (request rate×latency) plane is provided. All possible slices over that dimension are ranked by highest latency and the top k (e.g., top 100, etc.) slices are provided. Computation for these three fundamental operations is achieved by a trace analyzer using a novel "single-pass" analysis approach.

Significant factors determining the performance of trace analyzer queries may include (i) data transport, (ii) deserialization, and (iii) serialization. For example, the number of traces analyzed in a single query may be very high (e.g., in the billions or trillions). An architecture is provided that meets the requirements described while minimizing data transport, deserialization, and serialization.

To achieve predictable performance, statistical approximations may be used that apply a commutative and associative function on input traces. Such functions provide a "mergeable summary" or "digest", which allows intermediate results to be provided to users for interactivity. Intermediate results can then be merged iteratively to refine correctness of approximations and progressively improve accuracy interactively.

Overview

In one implementation, a request (such as the query 122 of FIG. 1) is sent from a front end (such as the UI implementation 118 of FIG. 1) to an API service (such as the API service 116 of FIG. 1) to start an analysis job. This returns a job ID to the front end. The front end continuously calls poll on the API service for analysis digest updates by passing a previously retrieved job ID. Each poll may include a new intermediate result state that is used by the front end to render updates of the result view. On a separate thread, the API service initiates a map-reduce style job. Workers (such as the workers 114A-N of FIG. 1) pull data from trace storage (such as the full fidelity trace data storage 106 of FIG. 1) and execute map-reduce operations. Workers then send new digest results and sampled example traces back to the API service. The API service retrieves an existing digest and sampled example traces for the job ID from a digest cache (such as the digest cache 112 of FIG. 1), merges the existing digest with the new digest, appends any new sampled example traces and stores the results back to the cache. The merged digest and sampled example traces are then formatted and returned for front end consumption as a response to the next poll request.

Example Implementation

A high-level objective of this implementation is to take a user's input (i.e. query) and provide output corresponding to all of the cube operations described in FIGS. 9-11. For example, a user would like to perform those cube operations for traces:

a. from December 1st to December 3rd,
    b. having the tag name/value pair region=west, and
    c. grouped by the tag name userID.

On the initial request, the digest cache is not referenced (since it does not contain an existing digest for the new job). On subsequent requests, the API service retrieves, formats, and returns to the front end whatever data is stored in the digest cache for this particular query from the user.

The API service then splits the requested time-range into a predetermined number (e.g., 60) intervals of even width. The API service then begins running a series of custom Map-Reduce style jobs, one for each interval in sequence. This procedure allows the progressive rendering of output to the UI as each interval is completed. Code for performing the cube operations may be embedded in the workers.

Trace records (also known as traces or trace data) are evenly partitioned in order to spread the input across workers. Since tracing data is primary-keyed by minute, only data for between December 1st to December 3rd is ever seen/read by workers. For each time interval, traces that don't have a matching region=west tag are filtered out. Additionally, traces that do not include any value for the tag userID are not included in the output for the HHQ or AGQ data-structures.

Worker output includes three "mergeable" data-structures (i.e. digests) provided back to the API service serialized in binary, which are deserialized by the API service for post-processing. These digests include a qDigest (such as the quantile digest 202 of FIG. 2), which includes an ungrouped/unranked quantile digest. This data structure supports the filtering cube operation shown in FIG. 9.

Figure 12:
FIG. 12 illustrates user interface results from performing the filtering cube operation shown in FIG. 9, according to at least one implementation.

FIG. 12 shows user interface results 1200 from performing the filtering cube operation shown in FIG. 9, according to at least one implementation. The results 1200 include a heat map 1202. These results 1200 may assist with the identification of a latency issue for a particular user ID tag. A heat map 1202 visualization helps identify a performance degradation over a particular time interval.

These digests also include an HHQ digest (such as the HHQ digest 204 of FIG. 2), which includes a frequency ranked list of groups with the associated latency quantiles for those groups. This data-structure supports the ranked slice by request rate cube operation shown in FIG. 10.

These digests also include an AGQ digest (such as the AGQ digest 206 of FIG. 2), which includes a latency quantile ranked list of groups with the associated frequency for the groups. This data-structure supports the ranked slice by latency cube operation shown in FIG. 11.

Figure 13:
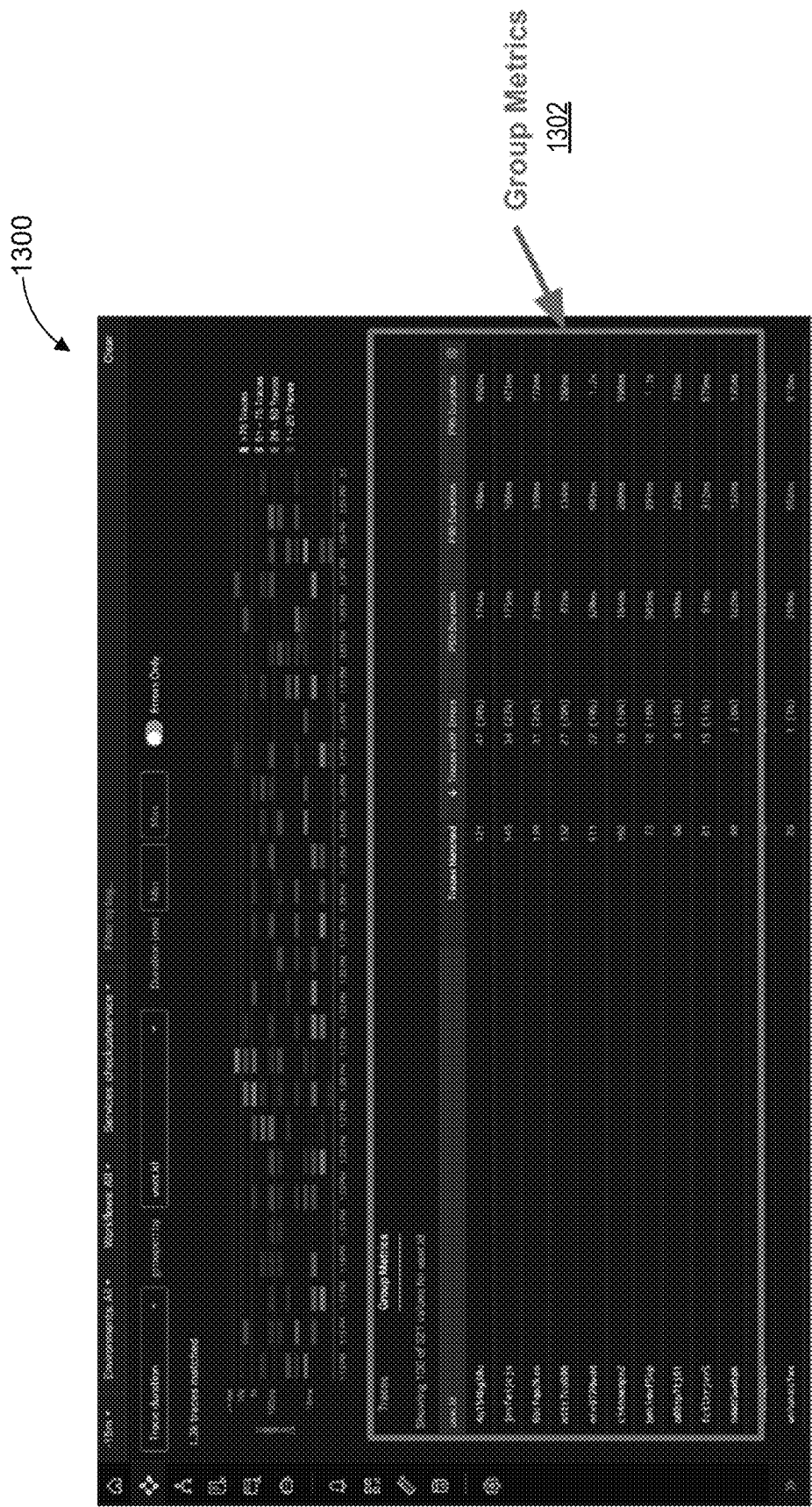
FIG. 13 illustrates user interface results from performing the ranked slice by request rate cube operation shown in FIG. 10 and the ranked slice by latency cube operation shown in FIG. 11, according to at least one implementation.

FIG. 13 shows user interface results 1300 from performing the ranked slice by request rate cube operation shown in FIG. 10 and the ranked slice by latency cube operation shown in FIG. 11, according to at least one implementation. The results 1300 include group metrics 1302. These results 1300 may assist with understanding the impact of a latency issue on all users. For example, the results 1300 show the top-100 user_ids ranked by the maximum latency of traces grouped by their user_id. This concrete trace view corresponds to the abstract illustration in FIG. 10. Ranking by request rate, instead of latency, would yield the trace view illustrated in FIG. 11.

For the first time interval, the output is stored in the digest cache. On receipt of output for subsequent intervals, the API service will retrieve the existing three digests for the entire query from the digest cache, and pair-wise merge all three existing digests with their counterparts from the new interval. Any previous results for that query in the digest cache may be overwritten. Additional sampled example traces are simply appended to previous results.

As the front end continues polling, the API service is now able to provide updated results that aggregate all previously processed time intervals. This simultaneously achieves the goals of reducing latency for feedback to the user, and continuously performing result aggregation, so that the presentation of results to the user is not arbitrarily subdivided by time intervals.

Figure 14:
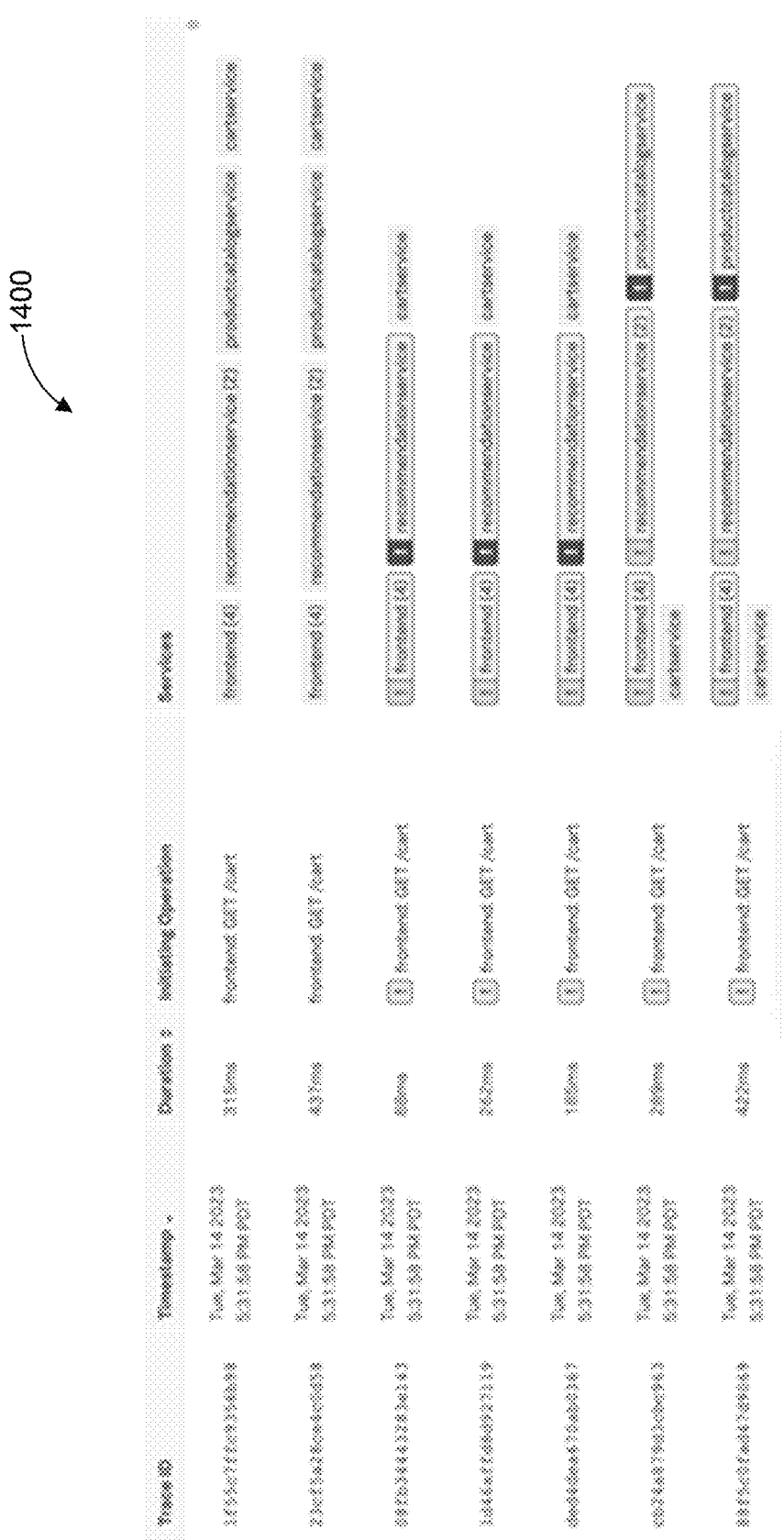
FIG. 14 shows an interface rendering of a list 1400 of sample example traces, according to at least one implementation.

FIG. 14 shows an interface rendering of a list 1400 of sample example traces, according to at least one implementation. These sample example traces may include traces stored in a trace sample buffer (such as the trace sample buffer 210 of FIG. 2) and incrementally merged (e.g., as shown in step 312 of FIG. 3). In one implementation, one or more users may select from this list 1400 to view a standard waterfall view of the trace spans.

Approximate Grouped Quantiles

In order to process a stream of records each consisting of a (string) key k and a real-valued (e.g., float) measurement x (e.g., a latency value), a data structure may be constructed that can answer (approximately) queries of the form "top N percentiles, grouped by key" for percentiles P50, P90, P99, etc.

A stream of records each consisting of a (string) key k and a real-valued (float, say) measurement x (typically a latency) is received for processing. Components of the data structure include a collection T of pairs (key k, qSketch S) equipped with the ability to return the pair (k, S) with minimal S (with respect to some comparator, e.g., S.quantile(0.9)). (Use a min-heap.) The qSketch at k will be denoted T[k] and the pair with the smallest qSketch will be denoted T.min. Those keys appearing in T will be called monitored. The overall capacity of T is bounded in advance (typically by some small multiple of the expected N in topN queries), and T has space when the number of monitored keys is less than the capacity of T. Since merging with a reservoir is not performed, the creation timestamp is not needed.

Components of the data structure also include a count-min sketch C on the keys. For any key k, this returns an upper bound (overestimate) C.count(k) on the number of times the key has appeared in the stream so far. Keys are added via C.add(k).

Both the incumbent T.min.sketch and the candidate (k, x) are viewed as distributions, and the incumbent replaces the candidate according to the probability that a randomly selected element of the candidate is larger than a randomly selected element of the incumbent.

Example AGO Implementation

The following example tracks the evolution of the AGQ data structure as it processes a stream of data points. A typical datapoint looks like {'idx': 'E', 'value': 0.55}. The information is the tag and the latency measurement: {'idx': 'E', 'value': 0.55}. There are five tags: A, B, C, D, E. The main algorithm state consists of at most two t-digests ('digests'), ordered by the P90 extracted from each. In practice hundreds of digests may be maintained for thousands to tens of thousands of tags, where fewer digests are maintained than there are tags.

The set of monitored tags ('monitored_idx') is presented as its own object; these are exactly the values of the key 'idx' appearing in 'digests'. The number of datapoints seen by the algorithm is also tracked in ('points_processed'). Realistic compression might be n=10000 points represented by centroids=50.

The state of the count-min sketch is excluded for simplicity. This would be updated with every datapoint and is consulted for probability calculations. Each point added may correspond to a trace.

At step 1, a point is added with the following values: {'idx': 'E', 'value': 0.55}. This is the first point to be added to the summary data structure, so a digest is created for the tag E.

The updated algorithm state is as follows:
{'digests': [{'digest': <T-Digest: n=1, centroids=1>,
    'idx': 'E', 'p90': 0.55}],
'monitored_idx': {'E'},
'points_processed': 1}

At step 2, a point is added with the following values: {'idx': 'D', 'value': 0.24}. Another digest can be accommodated, so one is created for tag D.

The updated algorithm state is as follows:
{'digests': [{'digest': <T-Digest: n=1, centroids=1>,
    'idx': 'E', 'p90': 0.55},
{'digest': <T-Digest: n=1, centroids=1>, 'idx': 'D', 'p90': 0.24}],
'monitored_idx': {'D', 'E'},
'points_processed': 21

At step 3, a point is added with the following values: {'idx': 'C', 'value': 4.74}. This value pushed D out and pushed E to second place.

The updated algorithm state is as follows:
{'digests': [{'digest': <T-Digest: n=1, centroids=1>,
    'idx': 'C', 'p90': 4.74},
{'digest': <T-Digest: n=1, centroids=1>, 'idx': 'E', 'p90': 0.55}],
'monitored_idx': {'C', 'E'},
'points_processed': 3}

At step 4, a point is added with the following values: {'idx': 'C', 'value': 1.89}. This was incorporated into the t-digest for tag C.

The updated algorithm state is as follows:
{'digests': [{'digest': <T-Digest: n=2, centroids=2>,
    'idx': 'C', 'p90': 4.74},
{'digest': <T-Digest: n=1, centroids=1>, 'idx': 'E', 'p90': 0.55}],
'monitored_idx': {'C', 'E'},
'points_processed': 4}

At step 5, a point is added with the following values: {'idx': 'E', 'value': 6.92}. Tags E and C swapped places.

The updated algorithm state is as follows:
{'digests': [{'digest': <T-Digest: n=2, centroids=2>, 'idx': 'E', 'p90': 6.92},
{'digest': <T-Digest: n=2, centroids=2>, 'idx': 'C', 'p90': 4.74}],
'monitored_idx': {'C', 'E'},
'points_processed': 5}

At step 6, a point is added with the following values: {'idx': 'C', 'value': 2.61}. Another point is added for tag C, otherwise no change is made.

The updated algorithm state is as follows:
{'digests': [{'digest': <T-Digest: n=2, centroids=2>, 'idx': 'E', 'p90': 6.92},
{'digest': <T-Digest: n=3, centroids=3>, 'idx': 'C', 'p90': 4.74}],
'monitored_idx': {'C', 'E'},
'points_processed': 6}

At step 7, a point is added with the following values: {'idx': 'A', 'value': 8.16}. Tag A is the new leader, and tag C is pushed out.

The updated algorithm state is as follows:
{'digests': [{'digest': <T-Digest: n=1, centroids=1>, 'idx': 'A', 'p90': 8.16},
{'digest': <T-Digest: n=2, centroids=2>, 'idx': 'E', 'p90': 6.92}],
'monitored_idx': {'A', 'E'},
'points_processed': 7}

At step 8, a point is added with the following values: {'idx': 'D', 'value': 1.68}. Candidate tag D didn't replace tag E.

The updated algorithm state is as follows:
{'digests': [{'digest': <T-Digest: n=1, centroids=1>, 'idx': 'A', 'p90': 8.16},
{'digest': <T-Digest: n=2, centroids=2>, 'idx': 'E', 'p90': 6.92}],
'monitored_idx': {'A', 'E'},
'points_processed': 8}

In one implementation, a stream of records is considered, each record consisting of a categorical-valued key and a real-valued measurement (typically a latency). A data structure is provided that can approximately answer queries of the form "top N keys, ranked by quantile q," with quantiles $q=0.5, 0.9, 0.99$ often being of particular interest.

HHQ combines per-key sketches for heavy hitters ("monitored" keys) with a reservoir in which all records participate. At query time, for monitored keys, only those reservoir items with a timestamp less than the timestamp of the sketch creation time are included. This approach may be modified to account for selection bias.

State

Following HHQ, a first attempt has two main components:

(1) (reservoir) A collection R of records (key k, measurement m, timestamp t).

(2) (per-key quantileSketches) A collection T of triples (key k, quantileSketch S, creationTimestamp t).

It may be noted that:

(1) Each quantileSketch S is some quantile sketch structure adapted to the problem, typically an asymmetric t-digest or a ReqSketch.

(2) The creationTimestamp is the timestamp of the first item inserted into this structure (i.e., the birthtime of S). Note a key may enter and exit the collection of monitored entities and this value pertains to the current instantiation of the structure.

(3) The number of sketches kept in T should be larger than the "N" expected to appear in Top-N queries.

HHQ may be modified by requiring the ability to return from T a minimal element (denoted T.min) with respect to ranking the maintained per-key sketches by P90 (i.e., $q=0.9$), hence T may be organized using a min-heap.

Using P90 as a comparator captures comparisons among the (empirical) distributions of the keys, with emphasis on the distribution near $q=0.9$. The quantileSketch at k will be denoted T[k]. Those keys appearing in T will be called monitored. The overall capacity of T is bounded in advance, and it may be noted that T has space when the number of monitored keys is less than the capacity of T. This is used in the insertion/replacement logic expressed below.

Mechanics

The insertion rule for a new record (key k, measurement m, timestamp t) consists of:

(1) Insertion of the record into the reservoir R.

(2) Modification of the collection T:

(a) If k is monitored, add m to its sketch: T [k].add(m).

(b) Else if T has space, add to the collection a new sketch (k, S (m), t).

(c) Else with probability T.min.quantileSketch.cd f (m), replace T.min with a new quantileSketch initialized with m (i.e., with (k, S (m), t)).

The idea is to replace the smallest sketch by a candidate unmonitored key according to the cdf (of the sketch) evaluated at the presented measurement: this captures the probability that the candidate measurement is greater than a measurement selected from the monitored key with "smallest" distribution.

At query time (when asked to produce the top N keys), R and T are merged following SQUAD logic: to quantileSketches in T relevant reservoir elements are added provided their timestamps precede the corresponding creationTimeStamp, with weights determined by the size of the reservoir compared to the overall stream size. Then the requested quantile is computed for each sketch, re-sorted if necessary, and the top N are returned.

When the ranking requested is by some other quantile far from $q=0.9$, T may be re-sorted after computing S.quantile (q) for each S appearing in T.

The AGQ Algorithm

In one implementation, the reservoir component may be exchanged with a structure aimed at the selection bias problem—an approximate counting algorithm sketch may be used to estimate how many measurements for a key were discarded as the stream was processed. This is applied to both monitored keys and "candidate" keys (being contemplated as replacements for the smallest keys). With this sketch available, a replacement rule (incorporating both the cdf of the previous approach, and the information available in the approximate counting algorithm sketch) may be implemented.

State

The main components are now:

(1) (approximate counting algorithm sketch) an approximate counting algorithm sketch C on the keys.

(2) (per-key quantileSketches) A collection T of pairs (key k, quantileSketch S).

From T it may be required that a minimal element (with respect to the P90 comparator) can be returned. What is needed from C is the ability to (over)estimate, via C.count (k), the number of occurrences of a key k seen thus far. Note that the sketch T [k] also possesses a count of the summarized measurements, and T [k].count ( )<=C.count (k) even if k was monitored throughout the life of the stream. (The quantity T [k].count ( ) is correct for those "always monitored" keys k; in general it provides a lower bound on the true count).

Mechanics

The core streaming insertion rule, adding a record (key k, measurement m), goes as follows:
- (1) Insertion of the record into the approximate counting algorithm sketch C.
- (2) Modification of the collection T:
  - (a) If k is monitored, addm to its sketch: T [k].add (m).
  - (b) Else if T has space, add to the collection a new sketch (k, S (m)).
  - (c) Else with probability f (k, m, T.min), replaceT min with a new quantileSketch initialized with m (i.e., with (k, S (m))).

To compute the probability f (k, m, T.min), the approximate counting algorithm sketch C may be used, more precisely the estimated counts of k and the smallest monitored key T.min.key.

Probability Computation

The principle is to view both the incumbent t:=T min and the candidate (k, m) as distributions, then replace the incumbent with the candidate according to the probability that a randomly selected element of the candidate is larger than a randomly selected element of the incumbent, now using C to account for unrecorded history. In the simple case where k has not been previously seen (i.e., C(k):=C.count (k)=1), and t.quantileSketch(=T [t.key]) was created with the first appearance of t.key, then we employ the cdf as before. So in this case the probability f (k, m, t) is simply t.cd f (m) (shorthand for t.quantileSketch.cd f (m)).

In general this probability will be roughly estimated by assuming the "forgotten" measurements (i.e., those comprising the discrepancy C(t.key)–t count ( ), and the discrepancy C(k)–1), are both smaller than the measurements summarized by t.

For simplicity it may be noted that the case k has not been previously seen (so C(k)–1=0), but the possibility that C(t.key)>t count ( ) may be allowed.

If m<t quantile (0), it may be assumed m is the median of the forgotten measurements, yielding our estimate of the overall cdf (i.e., including the forgotten measurements) at m as:

$$\frac{C(t \cdot \text{key}) - t \cdot \text{count}()}{2 * C(t \cdot \text{key})}$$

and return this as the probability f (k, m, t).

Otherwise t.cd f (m)>0, and we assume the discrepancy C(t.key)–t.count ( ) is a clump of values near t.quantile (0). This means we estimate m as being larger than (C(t.key)–t.count ( ))+t.cd f (m)*t.count ( ) values, hence the overall cdf (and probability f (k, m, t)) may be expressed as $$\frac{C(t \cdot \text{key}) + (t \cdot cdf(m) - 1) * t \cdot \text{count}()}{C(t \cdot \text{key})}.$$

In general there may be a need to additionally adjust for the previously seen measurements associated with the candidate k. Knowing that a measurement was forgotten provides some information on where it lies relative to (the value summarized by) t; for example it could not have been larger than t.quantile (1.0).

Bayes' formula provides:

$$P(cdf(y_1) \le q \mid y_1 R) = \frac{P(y_1 R \mid cdf(y_1) \le q)P(cdf(y_1) \le q)}{P(y_1 R)}$$

To compute the terms of the right hand side requires assumptions on the distribution of the candidate y1. Knowing nothing else, it may be assumed it is drawn from the same distribution against which it is being compared, i.e., its quantile cd f (y1) is drawn uniformly at random from [0, 1]. Thus the initial pdf of y1 is f0=1. ("R" means rejected.)

$$P(cdf(y_1) \le q) = \int_0^q f_0(t)dt = q$$

$$P(y_1 R \mid cdf(y_1) \le q) = \frac{\int_0^q f_0(t)(1-t)dt}{\int_0^q f_0(t)dt} = \frac{(q - q^2/2)}{q} = 1 - q/2$$

$$P(y_1 R) = P(y_1 R \mid cdf(y_1) \le 1) = \frac{\int_0^1 f_0(t)(1-t)dt}{\int_0^1 f_0(t)dt} = 1 - 1/2 = 1/2$$

Therefore P (cd f $(y_1) \le q|y_1 R)=(1-q/2)q/(1/2)$ and the pdf f1 of y1 (conditional on it having been rejected) is the derivative of this function, namely $2(1-q)$.

This information may be used to estimate p1, the probability y1 would be rejected again (conditional on it having been rejected once):

$$p_1 = \int_0^1 f_1(t)(1-t)dt = 2/3.$$

This will be used to influence the probability that we accept/reject the next measurement $y_2$ from the same time, via averaging. The decision rule is to reject with probability $1/2(p1+(1-\text{cd f}(y_2)))$. Now if $y_2$ is also rejected, what do we know about its distribution?

$$F_2 :=$$

$$P(cdf(y_2) \le q \mid y_1 R, y_2 R) = \frac{P(y_2 R \mid y_1 R, cdf(y_2) \le q)P(cdf(y_2) \le q \mid y_1 R)}{P(y_2 R \mid y_1 R)}$$

If it is assumed cd f (y2) is drawn uniformly from [0, 1], it is found that:

$$P(y_2 R \mid y_1 R, cdf(y_2) \le q) = \frac{1}{2}\left(\frac{2}{3} + \frac{\int_0^q f_0(t)(1-t)dt}{\int_0^q f_0(t)dt}\right) = \frac{1}{2}\left(\frac{2}{3} + \left(1 - \frac{q}{2}\right)\right)$$

$$P(cdf(y_2) \le q \mid y_1 R) = q$$

$$P(y_2 R \mid y_1 R) = \frac{1}{2}\left(\frac{2}{3} + \frac{\int_0^1 f_0(t)(1-t)dt}{\int_0^1 f_0(t)dt}\right) = \frac{1}{2}\left(\frac{2}{3} + \frac{1}{2}\right)$$

Therefore $$F_2 = \frac{\left(\frac{2}{3} + \left(1 - \frac{q}{2}\right)\right)q}{\frac{2}{3} + \frac{1}{2}}$$

and the pdf of y2 is given by $$\frac{\frac{5}{3} - q}{\frac{7}{6}}.$$

Then the probability p2 that y2 would be rejected again is $$\int_0^1 \frac{\left(\frac{2}{3} + 1 - q\right)(1-q)}{\frac{2}{3} + \frac{1}{2}} dq.$$

$$F_n := \frac{\left(p_1 + p_2 + \ldots + p_{n-1} + 1 - \frac{q}{2}\right)q}{p_1 + p_2 + \ldots + p_{n-1} + \frac{1}{2}}$$

Set $P_{n-1} := p_1 + p_2 + \ldots + p_{n-1}$ $p_n =$ $$\int_0^1 F_n'(q)(1-q)dq = \int_0^1 F_n(q)dq = \frac{\left[(P_{n-1}+1)\frac{q^2}{2} - \frac{q^3}{6}\right]_{q=0}^{q=1}}{P_{n-1} + \frac{1}{2}} = \frac{\frac{P_{n-1}}{2} + \frac{1}{3}}{P_{n-1} + \frac{1}{2}}$$

Thus a (rational) recursion for the sum of the pi's is obtained from which any particular pi can be derived.

If on the other hand it is assumed $y_2$ is distributed according to $f_1$ (the idea being each key has its own distribution that is attempted to be uncovered, $y_3$ is distributed according to $f_2$, etc., then we arrive at the following formula for $p_n$:

$$p_n = \frac{\frac{h_0^{a-1}}{n+2} + \frac{h_1^{n-1}}{n+1} + \frac{h_2^{n-1}}{n} + \ldots + \frac{h_{a-1}^{a-1}}{3}}{\frac{h_0^{n-1}}{n+1} + \frac{h_1^{n-1}}{n} + \frac{h_2^{n-1}}{n-1} + \ldots + \frac{h_{a-1}^{a-1}}{2}}.$$

Where $h^r_k$ denotes the complete symmetric polynomial of degree k in r variables, evaluated at $P_1, \ldots, P_r$.

When the replacement is made, the qSketch $S(x)$ may be added to the collection T (at k). The forgotten elements are still accounted for, being represented in C.

Computing Quantiles

The information in C should be merged with that in T, analogous to using a reservoir. Essentially this means to add a clump of points of size C.count(T.min.key)–T.min.sketch.count( ) less than or equal to T.min.sketch.quantile(0). Exactly how this is achieved depends on the details of the qSketch S itself.

Choice of QSketch

Desired accuracy might influence the choice as follows:
  t-digest if accuracy near both tails is desired (interested in both "bottom N" and "top N" queries)
  asymmetric t-digest if only one tail is of interest (true in many applications including APM—care about P90 but not P10).
  ReqSketch (implementation, paper)
  moment-based quantile sketch
  vanilla or logarithmic histogram Insertion Time The same qSketch may be attached to the frequent items tracked in the accompanying heavy hitters structure. The overall impact of the qSketch on performance may be determined by the insertion time.

Terms

The term "trace" as used herein generally refers to a record of the manner in which a single user request, also referred to as a transaction, propagates from one microservice (hereinafter interchangeably referred to as "service") to the next in a application. A transaction is generally described as an end-to-end request-response flow, from the making of the user's initial request to receiving the final response. A transaction often involves the interaction of multiple services. A trace is a record of a transaction and each trace may be identified using a unique trace identifier ("Trace ID"). The trace follows the course of a request or transaction from its source to its ultimate destination in a system. In one implementation, a trace may be conceptualized as a highly dimensional structured log that captures the full graph of user-generated and background request execution within an application, and includes valuable information about interactions as well as causality.

The term "span" as used herein generally refers to the primary building block of a trace, representing an individual unit of work done in a system. A trace is composed of one or more spans where a span represents a call within the request. It is appreciated that a call may be to a separate microservice or a function within a microservice. The trace represents the work done by each microservice which is captured as a collection of linked spans sharing the same unique Trace ID. Each component of the system may contribute a span—a named, timed operation representing a piece of the workflow. A span may also include a unique span ID, a service name (e.g., "analytics"), an operation name (e.g., "start"), duration (latency), start and end timestamps and additional annotations and attributes (e.g., tags such as key:value pairs). The annotations and attributes can describe and contextualize the work being done under a span. For example, each span may be annotated with one or more tags that provide context about the execution, such as the client instrumenting the software, a document involved in the request, an infrastructure element used in servicing a request, etc.

The term "tags" as used herein generally refers to key:value pairs that provide further context regarding the execution environment and enable user-defined annotation of spans in order to query, filter and comprehend trace data. Tag information is typically included with each span and there may be different levels of tag information included in a span. Tag information (including the 'key' and corresponding 'value') is typically included with each span and there may be different levels of tag information included in a span.

"Global tags" generally represent properties of a user-request (e.g., tenant name, tenant level, client location, environment type, etc.) and may be extracted from any span of the trace based on configured rules. A global tag for a particular span in a trace may be attributed to the other spans in a trace, because each span within a single trace may comprise the same global attributes. For example, if one span within a trace comprises a tag relating it to a request from a "gold" level "tenant," it may be inferred that other spans in the same trace are associated with the same request and, accordingly, from the same "gold" level "tenant." Consequently, the "tenant:gold" key-value pair or tag may be attributed to the other spans in the same trace.

"Span-level tags" comprise attributes that are specific to a particular span.

The term "root span" as used herein generally refers to the first span in a trace. A span without a parent is called a root span.

The term "child span" as used herein generally refers to a span that follows a root span, including a child of a child.

The term "parent span" as used herein generally refers to a span that executes a call (to a different service or a function within the same service) that generates another span, wherein the span executing the call is the "parent span" and the span generated in response to the call is the "child span." Each span may typically comprise information identifying its parent span, which along with the Trace ID, may be used to consolidate spans associated with the same user-request into a trace.

A "leaf span" is a childless span. As noted above, each span typically comprises information identifying its parent span. If a span in a trace that is not identified or referenced by another span as a parent span, the span is considered a leaf span.

A "leaf error span" is a span that is the last span of a chain of error spans and does not have a child span that is also an error span. A leaf error span may be a childless span, in which case it would also be a "leaf span." A leaf error span may, however, have a child span, but that child span is not an error span.

A "metric" as used herein generally refers to a single quantifiable measurement at a specific point in time. Combining the measurement with a timestamp and one or more dimensions results in a metric data point. A single metric data point may include multiple measurements and multiple dimensions. Metrics are used to track and assess the status of one or more processes. A metric typically comprises a numeric value that is stored as a timeseries. A timeseries is a series of numeric data points of some particular metric over time. Each time series comprises a metric plus one or more tags associated with the metric. A metric is any particular piece of data that a client wishes to track over time.

A "client" as used herein generally refers to a user of a monitoring service for monitoring and diagnosing problems associated with a application.

A "user" as used herein generally refers to a user of the application being monitored using the monitoring service.

Figure 15:
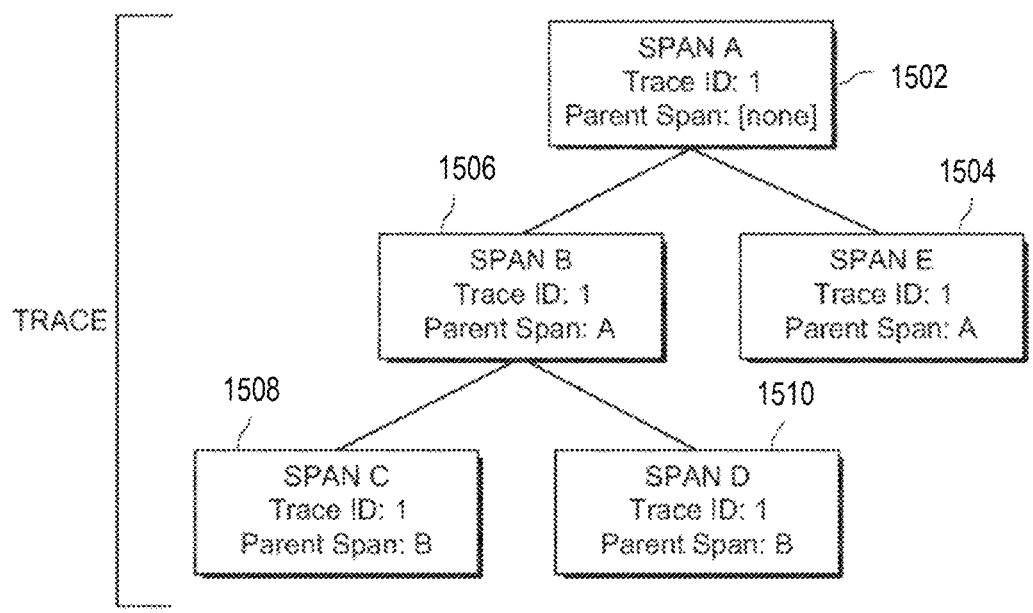
FIG. 15 illustrates an exemplary trace tree, according to at least one implementation.

FIG. 15 illustrates an exemplary trace tree. The first span in the trace tree, Span A 1502, is known as the root span. A trace tree typically comprises a root span, which is a span that does not have a parent. It may be followed by one or more child spans. Child spans may also be nested as deep as the call stack goes. Span B 1506 and Span E 1504 are child spans of the parent span, Span A. Further, Span C 1508 and Span D 1510 are child spans of the parent span Span B 1508.

Figure 16:
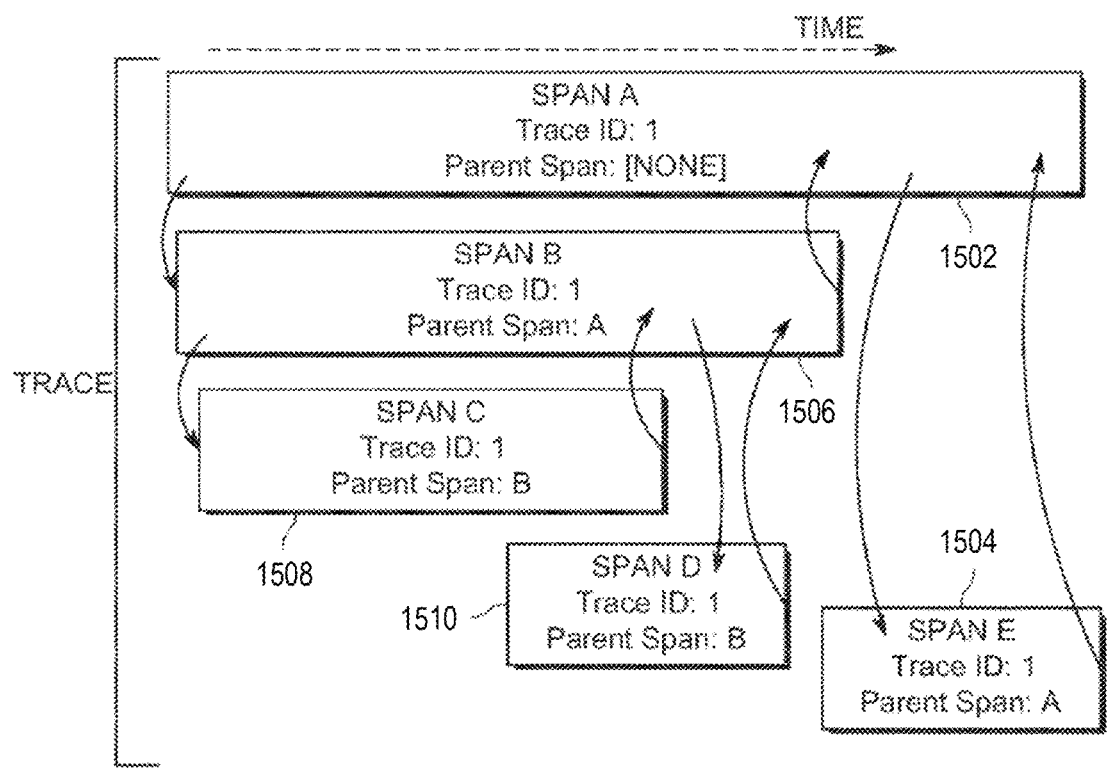
FIG. 16 illustrates an alternate view of the trace from FIG. 15 adjusted for timeline, according to at least one implementation.

FIG. 16 illustrates an alternate view of the trace from FIG. 15 adjusted for timeline. The trace starts with the Span A 1502, the root span, where the request starts. When the trace starts, a Trace ID is generated (e.g., Trace ID: 1 as shown in FIG. 15), which follows the request as it propagates through the system. A new span is generated for each logical chunk of work in the request, where the new span includes the same Trace ID, a new Span ID and a Parent Span ID, which points to the span ID of the new span's logical parent. The Parent Span ID creates a parent-child relationship between spans.

A given request typically comprises one span (e.g., the root Span A 1502) for the overall request and a child span for each outbound call made to another service, database, or a function within the same microservice etc. as part of that request. For example, in the example of FIG. 15, the Span A 1502 is the root span for the overall request and generates several child spans to service the request. The Span A 1502 makes a call to the Span B 1506, which in turn makes a call to the Span C 1508, which is a child span of the Span B 1506. The Span B 1506 also makes a call to the Span D 1510, which is also a child span of the Span B 1506. The Span A 1502 subsequently calls the Span E 1504, which is a child span of the Span A 1502. Note, that the spans in a given trace comprise the same Trace ID. The Trace ID along with the Parent Span ID may be used to consolidate the spans together into a trace.

More specifically, when a user first interacts with an application that is instrumented for application performance monitoring, for example by clicking the checkout button on an application to generate a backend application programming interface (API) call, that request is assigned a unique trace ID. As the request moves sequentially through the system, every operation performed on it, called a "span" or a "child span," is tagged with the initial trace ID, as well as its own unique ID, plus the ID of the operation that originally generated the current request. In other words, every span associated with a particular trace is encoded with data about the microservice process performing that span, and a trace is a collection of related spans.

Data Collection

Tracing data is generated through the instrumentation of applications, libraries and frameworks. Software may be instrumented to emit spans and traces. The spans and traces may be generated according to an industry standard, such as the OpenTracing standard. Other common open source instrumentation specifications include OPENTELEMETRY and OpenCensus. Each span may be annotated with one or more tags that provide context about the execution, such as the client instrumenting the software, a document involved in the request, an infrastructure element used in servicing a request, etc.

The instrumentation handles the creating of unique trace and span IDs, tracking latency, adding metadata and handling context data. Handling context data, also known as context propagation is critical and is responsible for passing context such as the trace ID between function/microservice calls, thereby, enabling an observer to view the entire transaction at each step along the way. Context propagation may, for example, be based on REST. REST is header-based and requires a transaction to pass headers between service-to-service calls. In order to work properly, services within a request use the same context propagation format. Once the code has been instrumented and context propagation has been implemented using a standard format, the trace data generated by the services may be collected and analyzed to monitor and troubleshoot the microservices-based applications generating the trace data.

Computer programs typically comprise one or more instructions set at various times in various memory devices of a computing device, which, when read and executed by at least one processor, will cause a computing device to execute functions involving the disclosed techniques. In some implementations, a carrier containing the aforementioned computer program product is provided. The carrier is one of an electronic signal, an optical signal, a radio signal, or a non-transitory computer-readable storage medium.

Any or all of the features and functions described above can be combined with each other, except to the extent it may be otherwise stated above or to the extent that any such implementations may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective implementations may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain implementations include, while other implementations do not include, certain features, elements and/or steps. Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation. Furthermore, use of "e.g.," is to be interpreted as providing a non-limiting example and does not imply that two things are identical or necessarily equate to each other.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is understood with the context as used in general to convey that an item, term, etc. may be either X, Y or Z, or any combination thereof. Thus, such conjunctive language is not generally intended to imply that certain implementations require at least one of X, at least one of Y and at least one of Z to each be present. Further, use of the phrase "at least one of X, Y or Z" as used in general is to convey that an item, term, etc. may be either X, Y or Z, or any combination thereof.

In some implementations, certain operations, acts, events, or functions of any of the algorithms described herein can be performed in a different sequence, can be added, merged, or left out altogether (e.g., not all are necessary for the practice of the algorithms). In certain implementations, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some implementations the connections between the components shown represent possible paths of data flow, rather than actual connections between hardware. While some examples of possible connections are shown, any of the subset of the components shown can communicate with any other subset of components in various implementations.

Implementations are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such implementations may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective implementations may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some implementations the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some implementations, certain operations, acts, events, or functions of any of the algorithms described herein can be performed in a different sequence, can be added, merged, or left out altogether (e.g., not all are necessary for the practice of the algorithms). In certain implementations, operations, acts, functions, or events can be performed concurrently, e.g., through multi-threaded processing, interrupt processing, or multiple processors or processor cores or on other parallel architectures, rather than sequentially.

What is claimed is:

1. A computer-implemented method, comprising:
   receiving, by a computer system, an instance of trace data that includes a tag and a latency measurement;
   in response to determining that a summary data structure, that includes different digests, includes a digest for the tag, updating, by the computer system, a latency percentile estimate stored within the digest for the tag within the summary data structure;
   in response to determining that the summary data structure does not include a digest for the tag:
   in response to determining that the summary data structure is not full, adding, by the computer system, a new digest for the tag to the summary data structure, and
   in response to determining that the summary data structure is full, by identifying that the summary data structure does not include any empty locations for new digests, replacing, by the computer system, an existing digest within the summary data structure with the new digest for the tag based on the latency measurement for the instance of trace data and a latency percentile estimate stored within the existing digest within the summary data structure, wherein replacing the existing digest within the summary data structure includes:
   for the different digests included within the summary data structure, determining updated latency percentile estimates, and
   reordering the different digests within the summary data structure based on the updated latency percentile estimates; and
   returning, by the computer system, the summary data structure.

2. The computer-implemented method of claim 1, further comprising updating, by the computer system, an approximate counting algorithm sketch for the tag in response to receiving the instance of trace data that includes the tag, the approximate counting algorithm sketch including a probabilistic data structure that stores a frequency of the tag.

3. The computer-implemented method of claim 1, further comprising, in response to determining that a summary data structure includes a digest for the tag:
   incrementing, by the computer system, a number of identified traces stored within the digest for the tag within the summary data structure, and
   adjusting, by the computer system, a number of centroids within the digest for the tag within the summary data structure.

4. The computer-implemented method of claim 1, wherein adding the new digest for the tag to the summary data structure includes:
   setting, by the computer system, a number of identified traces stored within the new digest for the tag to a value of one,
   setting, by the computer system, a number of centroids stored within the new digest for the tag to a value of one, and
   setting, by the computer system, a duration percentile estimate stored within the new digest for the tag based on the latency measurement for the instance of trace data.

5. The computer-implemented method of claim 1, further comprising comparing the updated latency percentile estimates for each of the different digests within the summary data structure.

6. The computer-implemented method of claim 1, wherein the determining, by the computer system, the updated latency percentile estimates comprises utilizing data stored within the digest and an approximate counting algorithm sketch for a tag represented by the digest.

7. The computer-implemented method of claim 6, wherein replacing the existing digest within the summary data structure with the new digest for the tag further includes:
   identifying, by the computer system, a digest within the summary data structure having a smallest updated latency percentile estimate.

8. The computer-implemented method of claim 7, wherein replacing the existing digest within the summary data structure with the new digest for the tag further includes:
   determining, by the computer system, an updated latency percentile estimate for the tag included within the instance of trace data, based on the latency measurement for the instance of trace data and an approximate counting algorithm sketch for the tag.

9. The computer-implemented method of claim 8, wherein replacing the existing digest within the summary data structure with the new digest for the tag further includes:
   in response to determining that the updated latency percentile estimate for the digest within the summary data structure having the smallest updated latency percentile estimate is less than the updated latency percentile estimate for the tag included within the instance of trace data, replacing, by the computer system, the digest within the summary data structure having the smallest updated latency percentile estimate with the new digest for the tag included within the instance of trace data.

10. The computer-implemented method of claim 6, further comprising storing, by the computer system, the updated latency percentile estimate for each digest within the summary data structure in a min heap data structure.

11. A system comprising:
    one or more processors configured to:
    receive an instance of trace data that includes a tag and a latency measurement;
    in response to determining that a summary data structure, that includes different digests, includes a digest for the tag, update a latency percentile estimate stored within the digest for the tag within the summary data structure;
    in response to determining that the summary data structure does not include a digest for the tag:
    in response to determining that the summary data structure is not full, add a new digest for the tag to the summary data structure, and
    in response to determining that the summary data structure is full, by identifying that the summary data structure does not include any empty locations for new digests, replace an existing digest within the summary data structure with the new digest for the tag, based on the latency measurement for the instance of trace data and a latency percentile estimate stored within the existing digest within the summary data structure, wherein replacing the existing digest within the summary data structure includes:
    for the different digests included within the summary data structure, determining updated latency percentile estimates, and
    reordering the different digests within the summary data structure based on the updated latency percentile estimates; and
    return the summary data structure.

12. The system of claim 11, wherein the one or more processors are further configured to update an approximate counting algorithm sketch for the tag in response to receiving the instance of trace data that includes the tag, the approximate counting algorithm sketch including a probabilistic data structure that stores a frequency of the tag.

13. The system of claim 11, wherein the one or more processors are further configured to, in response to determining that a summary data structure includes a digest for the tag:
increment a number of identified traces stored within the digest for the tag within the summary data structure, and
adjust a number of centroids within the digest for the tag within the summary data structure.

14. The system of claim 11, wherein adding the new digest for the tag to the summary data structure includes:
setting a number of identified traces stored within the new digest for the tag to a value of one,
setting a number of centroids stored within the new digest for the tag to a value of one, and
setting a duration percentile estimate stored within the new digest for the tag based on the latency measurement for the instance of trace data.

15. The system of claim 11, wherein the one or more processors are further configured to reorder the different digests within the summary data structure in response to values of the updated latency percentile estimates for each of the different digests within the summary data structure.

16. The system of claim 11, wherein the determining the updated latency percentile estimates comprises utilizing data stored within the digest and an approximate counting algorithm sketch for a tag represented by the digest.

17. The system of claim 16, wherein replacing the existing digest within the summary data structure with the new digest for the tag further includes:
identifying a digest within the summary data structure having a smallest updated latency percentile estimate.

18. The system of claim 17, wherein replacing the existing digest within the summary data structure with the new digest for the tag further includes:
determining an updated latency percentile estimate for the tag included within the instance of trace data, based on the latency measurement for the instance of trace data and an approximate counting algorithm sketch for the tag.

19. The system of claim 18, wherein replacing the existing digest within the summary data structure with the new digest for the tag further includes:
in response to determining that the updated latency percentile estimate for the digest within the summary data structure having the smallest updated latency percentile estimate is less than the updated latency percentile estimate for the tag included within the instance of trace data, replacing the digest within the summary data structure having the smallest updated latency percentile estimate with the new digest for the tag included within the instance of trace data.

20. A non-transitory computer-readable medium storing a set of instructions, the set of instructions when executed by one or more processors cause processing to be performed comprising:
receiving an instance of trace data that includes a tag and a latency measurement;
in response to determining that a summary data structure, that includes different digests, includes a digest for the tag, updating a latency percentile estimate stored within the digest for the tag within the summary data structure;
in response to determining that the summary data structure does not include a digest for the tag:
in response to determining that the summary data structure is not full, adding a new digest for the tag to the summary data structure, and
in response to determining that the summary data structure is full, by identifying that the summary data structure does not include any empty locations for new digests, replacing an existing digest within the summary data structure with the new digest for the tag, based on the latency measurement for the instance of trace data and a latency percentile estimate stored within the existing digest within the summary data structure, wherein replacing the existing digest within the summary data structure includes:
for the different digests included within the summary data structure, determining updated latency percentile estimates, and
reordering the different digests within the summary data structure based on the updated latency percentile estimates; and
returning the summary data structure.

* * * * *